US008627354B2

(12) United States Patent
Hellman

(10) Patent No.: US 8,627,354 B2
(45) Date of Patent: Jan. 7, 2014

(54) TIERED SUBSCRIPTION BROADCAST SYSTEM

(75) Inventor: Martin E Hellman, Stanford, CA (US)

(73) Assignee: Martin E. Hellman, Stanford, CA (US)

( * ) Notice: Subject to any disclaimer, the term of this patent is extended or adjusted under 35 U.S.C. 154(b) by 1888 days.

(21) Appl. No.: 11/305,379

(22) Filed: Dec. 16, 2005

(65) Prior Publication Data

US 2007/0140318 A1 Jun. 21, 2007

Related U.S. Application Data

(60) Provisional application No. 60/698,786, filed on Jul. 12, 2005, provisional application No. 60/714,539, filed on Dec. 17, 2004.

(51) Int. Cl.
*H04N 7/10* (2006.01)
*H04N 7/025* (2006.01)

(52) U.S. Cl.
USPC ............................................... 725/34; 725/35

(58) Field of Classification Search
USPC ........................................ 348/731; 725/1–47
See application file for complete search history.

(56) References Cited

U.S. PATENT DOCUMENTS 4,083,003 A 4/1978 Haemmig
4,135,156 A 1/1979 Sanders et al.
4,217,588 A 8/1980 Freeny, Jr.
4,344,171 A 8/1982 Lin
4,720,873 A * 1/1988 Goodman et al. .............. 725/32
4,744,024 A 5/1988 Potash et al.
5,365,569 A 11/1994 Witsaman et al.
5,387,927 A 2/1995 Look et al.
5,438,423 A 8/1995 Lynch et al. .................. 386/109
5,592,471 A 1/1997 Briskman
5,649,284 A 7/1997 Yoshinobu
5,677,918 A 10/1997 Tran et al.
5,686,954 A 11/1997 Yoshinobu et al.
5,768,527 A 6/1998 Zhu et al.
5,784,376 A 7/1998 Le Gall
5,790,937 A 8/1998 Gutle
5,815,671 A 9/1998 Morrison
5,896,555 A 4/1999 Yoshinobu
6,011,509 A 1/2000 Dutka
6,061,760 A 5/2000 Huang
6,163,683 A 12/2000 Dunn et al.
6,167,235 A 12/2000 Sibecas et al.
6,177,960 B1 1/2001 Van Luyt
6,192,340 B1 2/2001 Abecassis
6,249,532 B1 6/2001 Yoshikawa et al.
6,272,190 B1 8/2001 Campana, Jr.
6,289,455 B1 9/2001 Kocher et al.

(Continued)

OTHER PUBLICATIONS

A.J. McAuley, "Reliable Broadband Communication Using a Burst Erasure Correcting Code"; ACM 1990.*

(Continued)

*Primary Examiner* — Jason J Chung
*Assistant Examiner* — James R Marandi
(74) *Attorney, Agent, or Firm* — Dov Rosenfeld; Inventek

(57) ABSTRACT

A broadcast system is disclosed that allows a broadcaster to provide multiple levels of subscription services. Subscribers have the option of listening to fewer (or no) commercials if they pay a higher fee, or listening to more commercials if they pay a lower (or no) fee. Commercials can be demographically targeted, cannot be skipped, and can be audited for billing purposes.

37 Claims, 6 Drawing Sheets

(56) References Cited

U.S. PATENT DOCUMENTS

| | | | |
|---|---|---|---|
| 6,307,487 | B1 | 10/2001 | Luby |
| 6,320,520 | B1 | 11/2001 | Luby |
| 6,373,406 | B2 | 4/2002 | Luby |
| 6,411,223 | B1 | 6/2002 | Haken et al. |
| 6,434,622 | B1 | 8/2002 | Monteiro et al. |
| 6,463,585 | B1 | 10/2002 | Hendricks et al. |
| 6,486,803 | B1 | 11/2002 | Luby et al. |
| 6,564,003 | B2 | 5/2003 | Marko et al. |
| 6,587,127 | B1 | 7/2003 | Leeke et al. |
| 6,594,794 | B1 | 7/2003 | De Marzi et al. |
| 6,600,908 | B1 | 7/2003 | Chan |
| 6,608,994 | B1 | 8/2003 | Wegener et al. |
| 6,609,097 | B2 | 8/2003 | Costello et al. |
| 6,614,366 | B2 | 9/2003 | Luby |
| 6,640,305 | B2 | 10/2003 | Kocher et al. |
| 6,697,608 | B2 | 2/2004 | King-Smith |
| 6,704,556 | B1 | 3/2004 | Eaton et al. |
| 6,725,022 | B1 | 4/2004 | Clayton et al. |
| 6,785,656 | B2 | 8/2004 | Patsiokas et al. |
| 6,834,156 | B1 * | 12/2004 | Marko et al. .................... 386/94 |
| 6,845,230 | B2 | 1/2005 | Syed |
| 6,873,629 | B2 | 3/2005 | Morris |
| 6,876,835 | B1 | 4/2005 | Marko et al. |
| 6,944,142 | B2 | 9/2005 | Grieco |
| 6,961,370 | B2 | 11/2005 | Chappell |
| 7,024,685 | B1 | 4/2006 | Foster et al. |
| 7,026,957 | B2 | 4/2006 | Rubenstein |
| 7,117,075 | B1 | 10/2006 | Larschan et al. |
| 7,180,917 | B1 * | 2/2007 | Marko et al. .................. 370/535 |
| 7,197,234 | B1 | 3/2007 | Chatterton |
| 7,216,358 | B1 | 5/2007 | Vantalon et al. |
| 7,474,621 | B2 | 1/2009 | Mimura et al. |
| 7,486,640 | B2 | 2/2009 | Borsos et al. |
| 7,490,053 | B1 * | 2/2009 | Emerson et al. ................ 705/14 |
| 7,505,966 | B2 | 3/2009 | Kato |
| 7,720,432 | B1 | 5/2010 | Colby et al. |
| 7,840,178 | B2 | 11/2010 | Hellman |
| 2001/0019310 | A1 | 9/2001 | Luby |
| 2001/0036224 | A1 * | 11/2001 | Demello et al. .............. 375/220 |
| 2002/0087685 | A1 | 7/2002 | Lassen et al. |
| 2002/0107968 | A1 | 8/2002 | Horn et al. |
| 2002/0116277 | A1 | 8/2002 | Kraft |
| 2002/0129159 | A1 | 9/2002 | Luby et al. |
| 2002/0129362 | A1 * | 9/2002 | Chang et al. .................... 725/32 |
| 2002/0132575 | A1 | 9/2002 | Kesling et al. |
| 2002/0184038 | A1 | 12/2002 | Costello et al. |
| 2002/0190878 | A1 | 12/2002 | Luby |
| 2003/0014767 | A1 | 1/2003 | Stumphauzer |
| 2003/0058958 | A1 | 3/2003 | Shokrollahi et al. |
| 2003/0122959 | A1 | 7/2003 | Ishida et al. ............... 348/426.1 |
| 2003/0129941 | A1 | 7/2003 | Kawamata et al. |
| 2003/0192060 | A1 | 10/2003 | Levy ............................ 725/133 |
| 2003/0226089 | A1 | 12/2003 | Rasmussen et al. |
| 2003/0236843 | A1 | 12/2003 | Weber et al. |
| 2004/0003399 | A1 * | 1/2004 | Cooper ........................... 725/38 |
| 2004/0021588 | A1 | 2/2004 | Luby |
| 2004/0075593 | A1 | 4/2004 | Shokrollahi et al. |
| 2004/0083487 | A1 | 4/2004 | Collens et al. |
| 2004/0101274 | A1 | 5/2004 | Foisy et al. |
| 2004/0110468 | A1 | 6/2004 | Perlman |
| 2004/0116069 | A1 | 6/2004 | Fadavi-Ardekani et al. |
| 2004/0116070 | A1 * | 6/2004 | Fishman et al. ............. 455/3.02 |
| 2004/0163135 | A1 | 8/2004 | Giaccherini |
| 2004/0199654 | A1 | 10/2004 | Juszkiewicz |
| 2004/0205028 | A1 | 10/2004 | Verosub et al. |
| 2004/0225519 | A1 | 11/2004 | Martin |
| 2004/0266336 | A1 | 12/2004 | Patsiokas et al. |
| 2005/0172329 | A1 | 8/2005 | Kim et al. |
| 2006/0008256 | A1 | 1/2006 | Khedouri et al. |
| 2006/0070095 | A1 | 3/2006 | Newton et al. |
| 2006/0136967 | A1 | 6/2006 | Hellman |
| 2006/0190970 | A1 | 8/2006 | Hellman |
| 2007/0014536 | A1 | 1/2007 | Hellman |
| 2007/0065122 | A1 | 3/2007 | Chatterton |
| 2007/0237329 | A1 | 10/2007 | Qawami et al. |

OTHER PUBLICATIONS

U.S. Appl. No. 09/695,226, Marko et al.
U.S. Appl. No. 09/695,228, Marko et al.
U.S. Appl. No. 60/698,786, Hellman.
U.S. Appl. No. 60/714,539, Hellman.
NIST FIPS PUB-197 "Announcing the Advanced Encryption Standard (AES)," Nov. 26, 2001, pp. i-iii and 1-26. Available from NTIS, 5285 Port Royal Road, Springfield, VA 22161 and on-line at http://csrc.nist.gov/publications/fips/fips197/fips-197.pdf.
NIST Special Publication 800-38A "Recommendation for Block Cipher Modes of Operation," Dec. 2001, pp. i-vii and 1-16. Available from Superintendant of Documents, US Govt Printing Office, Mail: Stop SSOP, Washington, DC 20402-0001.
NIST FIPS PUB 186-2 "Digital Signature Standard (DSS)," Jan. 27, 2000, pp. i-ii, 1-2 and 7-10. Available from NTIS at above address.
NIST FIPS PUB 180-2, "Announcing the Secure Hash Standard," Aug. 1, 2002, pp. i-iii and 3-16. Available from NTIS at above address.
Layer, David H, Digital Radio Takes to the Road, IEEE Spectrum, Jul. 2001, pp. 40-46.
Office Action for U.S. Appl. No. 11/303,605 mailed Nov. 24, 2009.

* cited by examiner

| | | | | | | |
|---|---|---|---|---|---|---|
| $P_1 = R_1 =$ | $s_{1,1}$ | $s_{1,2}$ | $s_{1,3}$ | ... | $s_{1,4999}$ | $s_{1,5000}$ |
| $P_2 = R_2 =$ | $s_{2,1}$ | $s_{2,2}$ | $s_{2,3}$ | ... | $s_{2,4999}$ | $s_{2,5000}$ |
| $P_3 = R_3 =$ | $s_{3,1}$ | $s_{3,2}$ | $s_{3,3}$ | ... | $s_{3,4999}$ | $s_{3,5000}$ |
| .. | .. | | .. | | .. | |
| $P_{288} = R_{288} =$ | $s_{288,1}$ | $s_{288,2}$ | $s_{288,3}$ | ... | $s_{288,4999}$ | $s_{288,5000}$ |
| $P_{289} =$ | $s_{289,1}$ | $s_{289,2}$ | $s_{289,3}$ | ... | $s_{289,4999}$ | $s_{289,5000}$ |
| $P_{290} =$ | $s_{290,1}$ | $s_{290,2}$ | $s_{290,3}$ | ... | $s_{290,4999}$ | $s_{290,5000}$ |
| .. | .. | | .. | | .. | |
| $P_{65534} =$ | $s_{65534,1}$ | $s_{65534,2}$ | $s_{65534,3}$ | ... | $s_{65534,4999}$ | $s_{65534,5000}$ |
| $P_{65535} =$ | $s_{65535,1}$ | $s_{65535,2}$ | $s_{65535,3}$ | ... | $s_{65535,4999}$ | $s_{65535,5000}$ |

TIERED SUBSCRIPTION BROADCAST SYSTEM

CROSS-REFERENCE TO RELATED APPLICATIONS AND DISCLOSURE DOCUMENT

This Patent Application claims the benefit of U.S. patent application Ser. No. 11/015634 "Broadcast System with Differentiated Receivers" filed Dec. 17, 2004 and converted to U.S. Provisional Patent Application Ser. No. 60/714,539, the contents of which are incorporated by reference herein. This Patent Application is related to U.S. Patent Disclosure Document No. 572293 "Preloaded Media Distribution System" filed Mar. 8, 2005, the contents of which are incorporated by reference herein. This Patent Application also claims the benefit of U.S. Provisional Patent Application Ser. No. 60/698786 "Storage-Based Media Broadcasting and Distribution System" filed Jul. 12, 2005, the contents of which are incorporated by reference herein. Related subject matter is disclosed and claimed in U.S. patent Application Ser. Nos. 11/305,097 and 11/303,605 to Martin E. Hellman filed even date herewith and titled "SECURITY ENHANCED TIERED SUBSCRIPTION BROADCAST SYSTEM" and "Dropout-Resistant Media Broadcasting System," respectively, now U.S. Pat. Nos. 7,865,917 and 8,270,901, respectively. The contents of said U.S. patent application Nos. 11/305,097 and 11/303,605 are incorporated by reference herein.

FIELD OF THE INVENTION

The present invention relates to a broadcast system which offers subscribers a tiered approach to subscription fees.

BACKGROUND OF THE INVENTION

Sirius Satellite Radio and XM Satellite Radio are two companies currently providing subscription digital satellite radio services. Such services are referred to as S-DARS, for Satellite Digital Audio Radio Service, or more succinctly as satellite radio. In both the case of Sirius and XM, it is inherent in their design to simultaneously transmit signals to radio receivers from multiple satellites and a network of "terrestrial repeaters" (multiple ground-based transmitters, located for example in large cities, where tall buildings often block satellite reception). See for example, David H. Layer, "Digital Radio Takes to the Road," IEEE Spectrum, July 2001, pages 40-46. Such satellite transmission, per se, is not the subject of the instant invention.

Subscription fees for service with no advertising need to be higher than subscription fees for service with advertising since the full cost of the service must be borne by the user when there is no advertising revenue. Initially, Sirius offered commercial-free music at a monthly subscription fee of $12.95 and XM offered partly commercial-free music at a monthly subscription fee of $9.95. Sirius' totally commercial-free music was a competitive advantage for many potential subscribers and, on Feb. 1, 2004, XM's music channels also became totally commercial-free. However, XM could not immediately raise its subscription fee without alienating much of its existing subscriber base and had to suffer a loss of revenue for over a year before it was able to raise its rates to match those of Sirius.

Terrestrial radio, particularly in the 88-108 MHz FM band, faces a similar problem as it converts to a digital format known as HD radio. If a network of stations goes commercial-free, it alienates subscribers who do not wish to pay a subscription fee. But, if the network maintains its current, commercial-supported approach, it loses to satellite radio the significant fraction of its listener base which prefers commercial-free radio.

The dilemma faced by XM and terrestrial radio can be solved by offering tiered subscription services, ranging from totally commercial-free to totally commercial-supported. Then each subscriber can choose the plan that best meets his or her needs.

A system for providing such a tiered subscription service can be easily, but inefficiently, accomplished by having two versions broadcast for each channel: one with commercials and one without. The version that contains commercials clearly also has less entertainment content, since some time is being used by the commercials. In the case of popular music, the content usurped by the commercials can be one or more entire songs since each song lasts approximately three minutes and commercial breaks typically last at least about that long.

The above-described two tier system, which transmits two versions of each channel, one with and one without commercials, has a major drawback in that it would halve the number of channels that the broadcaster could offer. Effectively, each channel has become two channels, one with commercials and one without.

The present invention allows a broadcaster to deliver two or more tiers of services over a single channel and charge subscribers different or no subscription fees, with fewer or no commercials being delivered to the highest tier subscribers. To accomplish this, the present invention uses memory located at the receiver to store commercials and has the broadcaster transmit receiver commands telling lower tiered subscribers' radios which content segments of the normal program are to be deleted and which commercials are to be inserted in their place.

The use of memory at a receiver is well known in the art. DirectTV, for example, offers a TiVo equipped satellite television receiver, which can store programs on a hard drive and play them back at a later time. In U.S. Pat. No. 6,785,656 "Method and apparatus for digital audio playback using local stored content" Patsiokas et al describe a similar system for use with satellite radio. Since TiVo and its competitors are called PVR's (Personal Video Recorders), Patsiokas' invention might be called a PAR (Personal Audio Recorder).

In U.S. Pat. No. 6,564,003 Marko et al describe another use of memory with satellite radio. Marko demodulates the bit stream from a broadcaster, such as XM Satellite Radio, and records it on a memory medium (e.g., a recordable CD) for later playback at a location that either cannot receive the satellite signal or does not need real time reception. As in Patsiokas, the selection of the recorded program to be played back is subscriber controlled.

In contrast to Patsiokas and Marko, the present invention has the broadcaster, not the subscriber, determine when to access stored content and which stored content is accessed. These determinations are done in a manner substantially different from the cited prior art and for a totally different purpose. Whereas Patsiokas and Marko used memory at the receiver to enhance the subscriber's listening experience, this aspect of the present invention uses such memory to allow tiered subscription services.

In US Patent Application 2004/0116070 "Method, system, and computer program product for providing multi-tiered broadcasting services," filed Nov. 20, 2003, Fishman et al describe a tiered subscription system for use with satellite radio. The present invention gives the broadcaster greater control than Fishman, thereby providing a better experience for the subscriber and more effective exposure for the advertiser. For example, in the present invention, specific songs can be deleted to make room for ads, ads can be targeted to specific subscribers, ads are less likely to be lost in transmission, ads that are lost in transmission are replaced by similar ads, audit information is provided to the broadcaster and advertiser, and the radio receiver is more secure.

In U.S. Pat. No. 5,815,671 "Method and apparatus for encoding and storing audio/video information for subsequent predetermined retrieval," issued Sep. 29, 1998, Morrison describes a system for customizing entertainment for individual subscribers which includes the possibility of offering commercial-free service to some subscribers and commercial-supported service to other subscribers. Unlike the present invention, Morrison's system is designed to work in non-real-time, utilizing stored program material, and is thus not usable with real-time broadcast systems such as satellite radio. Morrison's system is also designed to work with a totally new class of receivers and did not, as the present invention, have to allow pre-existing receivers to continue to function. The advantages of the present invention listed above relative to Fishman (specific songs can be deleted to make room for ads, ads can be targeted to specific subscribers, ads are less likely to be lost in transmission, ads that are lost in transmission are replaced by similar ads, audit information is provided to the broadcaster and advertiser, and the radio receiver is more secure) are also advantages over Morrison.

In U.S. Pat. No. 6,289,455 "Method and apparatus for preventing piracy of digital content" Kocher et al describe a secure CryptoFirewall which protects critical portions of memory so that cryptographic keys used by a cryptoprocessor are inaccessible to all other parts of the system. These keys are made inaccessible to avoid the danger of a pirate attempting to learn them, creating a CryptoFirewall in Kocher's terminology. This architecture prevents the frequent error in the implementation of cryptograpic systems of storing keys in normal read-write memory where the keys are potentially accessible to piracy. The thinking behind this frequent error is that keys need to be written when entered and read when used for encryption or decryption. While this is true, allowing keys to be read by parts of the system which have no need for them other than for piracy, is extremely dangerous. Kocher, however, makes no use of commercials or of tiered subscription services.

In U.S. Pat. No. 6,434,622 "Multicasting method and apparatus" Monteiro et al use multicasting over the Internet to target advertising based on user demographics.

In US Patent Application 2004/0083487 Collens et al describe a media distribution system which delivers content to a user in encrypted form and then delivers keys to unlock the content on a specific playback device.

DEFINITIONS

For ease of exposition within the claims of this patent, the word subset has its normal mathematical meaning, and means a proper subset or the entire set. Similarly, the word portion means a proper portion (i.e., less than the whole) or the whole; and some includes the possibility of all. If a subset must be a proper subset, the term proper subset will explicitly be used; if a portion must be a proper portion, the term proper portion will explicitly be used; and, if some does not include the possibility of all, some, but not all will explicitly be used.

For ease of exposition within the claims of this patent the word portion includes the union of one or more subportions. For example, if a signal lasts from 0 to 100 seconds, a first portion of the signal might last from 0 to 1 seconds, and a second portion of the signal might last from 10 to 11 seconds. The first portion and second portion, taken together, also constitute a portion of the signal.

For ease of exposition within the claims of this patent, phrases such as "inserting content A into content B" includes both the possibility that some of content B is deleted to make room for inserted content A, and the possibility that all of content B is retained when content A is inserted.

For ease of exposition within the claims of this patent, in terms such as "reproduce substantially all program content transmitted on said current program channel during the time periods receivers in said first proper subset are specifying said current program channel," the phrase substantially all is used to account for minor losses of the program content, such as unavoidably occur due to delays in tuning to a new channel.

SUMMARY OF THE INVENTION

While the invention is illustrated using specific technologies and examples, all such technologies and examples are intended solely for clarity of illustration, and not by way of limitation. Similar technologies and examples known in the art or developed in the future can be substituted without departing from the spirit of the invention. Unless otherwise stated, all descriptions below are of the preferred embodiment. For clarity of exposition, that limitation will not be repeated each time it applies and is tacit.

Similarly, whenever an embodiment is said to use any method or device known to accomplish a goal, that includes both methods known currently or developed in the future. Again for clarity of exposition, the inclusion of methods developed in the future is tacit.

According to the present invention, a broadcaster can offer subscribers a tiered approach to subscription fees and subscriber (or receiver) privileges in which subscribers have the option of fewer (or no) commercials if they pay a higher fee, or more commercials if they pay a lower (or no) fee. Pre-existing receivers, which were built without thought to such tiered service, will continue to work, but all such pre-existing receivers are assigned to the same tier.

While the present invention lends itself to any plurality of tiers of receiver privileges and with any level of commercials on each tier, for simplicity of exposition, much of the description uses two tiers, one with no commercials and one with commercials. It should be understood, however, that with minor modifications that would be obvious to one skilled in the art, the same description applies to three or more tiers.

To improve the efficiency of the system, commercials and other additional information are sent on an auxiliary channel, typically a digital sub-channel of the primary broadcast channel, and stored in memory (preferably flash semiconductor memory, but alternatively a hard disk drive, optical memory, or any other kind of memory) in the receiver. The normal channel contains the commercial free version of the program. A receiver controller, implemented via a microprocessor and associated software, receives receiver commands from the transmitter which allow pre-existing receivers and subscribers at the higher tier to receive the commercial free version uninterrupted, but substitutes stored commercials for a portion of the normal program broadcast for lower tier subscribers. The portion of the normal program that is deleted to make room for commercials is specified by the broadcaster as part of the receiver commands that the broadcaster sends to the receiver.

The above-described method requires much less additional bandwidth than the doubling required by the simple "two broadcasts for each channel" method. This is because commercials or other additionally transmitted information are recorded in memory. Such stored commercials can be repeated a number of times and can be used on numerous channels, but need to be transmitted only once on the auxiliary channel. It is even possible to have no bandwidth expansion by using receiver commands to tell the receiver to record specific commercials from existing program channels. For example, both Sirius and XM currently have commercials on their talk channels, with only their music channels being commercial free. Even in this event, the recorded commercials will be regarded as "additional information" since they are in addition to the program content of the commercial free program channels.

Cryptographic and physical security precautions are used to deter even sophisticated thieves from pirating the higher tier privileges without paying the associated subscription fee.

Broadcasts of songs particularly lend themselves to inserting stored commercials in place of some program content since a typical song is about three minutes long, allowing commercial breaks of that length, or approximate multiples thereof. The lengths of the commercials can be chosen (both initially on recording and later on playback) to allow seamless continuity of the broadcast to both tiers of subscribers. For example, by having commercials of varying lengths, the receiver controller can be directed (from a central control at the broadcast studio) or decide (on its own) or use some combination thereof, to determine which commercials to insert in place of a given song of a particular length in order to have virtually no dead space or overlap. Short overlaps are not annoying and can be made even more pleasing by using a "fade-in/fade-out" transition.

The present invention allows different stored commercials to be chosen for different subscribers. The receiver controller can either access (if stored locally) or be directed by (if stored remotely) a subscriber database which indicates which commercials are likely to be of most interest to each subscriber or class of subscribers and therefore of most value to advertisers. Because a local database can be updated over the broadcast channel (by directing the update to a specific receiver or a specific class of receivers), even a local database can contain information not directly accessible at the receiver.

The database can make use of the subscriber's listening habits. For example, subscribers who listen to classical stations are more likely to buy books, so that ads for bookstores can be directed to those subscribers. As another example, using the zip code of the subscriber allows subscribers from wealthy communities to receive more brokerage house ads, while subscribers from economically deprived communities could receive more ads from discount stores. More elaborate databases can make use of on-line searches, on-line browsing habits, buying patterns, credit reports, etc. as allowed by law and custom. Such finely tuned advertising is attracting an ever larger share of available funds as evidenced by Google's financial success, and the present invention allows broadcasters to compete in that market.

Subscribers can be grouped into classes (e.g., all subscribers in a particular zip code) or assigned commercials on an individual basis.

For use with broadcast radio, either terrestrial- or satellite-based, any dead space after insertion of the additional information is filled with short segments of music, DJ patter, etc. which can be stored along with commercials in the receiver's memory, and are also considered "additional information" herein.

Television broadcast of news also lends itself to inserting stored commercials in place of some content since news segments of several minutes are typical, again allowing commercial breaks of that duration or multiples thereof.

Some radio and most television broadcasts consist of longer segments, requiring a slightly different approach. Using a 20-minute TV sitcom in a 30-minute time slot as an example, the channel could broadcast the uninterrupted sitcom in the first 20 minutes and non-commercial material of interest to the viewer (e.g., best scenes from previous episodes of the sitcom, or interviews with the actors) during the final 10 minutes of the 30-minute slot. The receiver controller in each subscriber's receiver would allow higher tier subscribers to receive the material as broadcast, but would interrupt the first 20 minutes of broadcast at appropriate points and insert commercials sent over an auxiliary channel, while buffering the rest of the sitcom in memory for playback after the commercials. With current technology, such content buffering would preferably be on hard disk, but any form of memory that is or becomes economically viable can be used.

The present invention includes a reverse channel from the receiver to the broadcaster for auditing which commercials have been listened to by which subscribers. This information allows advertisers to be billed on the basis of how many and what type of subscriber has heard their ads. It also eliminates the cost of Arbitron, Nielsen, or similar ratings organizations and provides more accurate and timely information. The present invention includes mechanisms that prevent subscribers who are commercial-supported from skipping over commercials or turning to other sources of entertainment (e.g., a CD player) when commercials are scheduled.

As described thus far, pre-existing receivers that do not have the receiver controller for inserting commercials would receive commercial-free service since that is what is broadcast on the normal content channel. It is possible to reverse the order and broadcast content with commercials in the normal channel and have stored non-commercial material inserted by the receiver controller for higher tier subscribers. In that case, pre-existing receivers would receive content with commercials.

Multiplexing

Multiplexing techniques known in the art are used in the present invention to share the data rate of the channel to deliver commercials, database updates, receiver commands and other material for storage in the receiver's memory while still delivering normal program content. Multiplexing techniques include, for example, time-division multiple access (TDMA), frequency-division multiple access (FDMA), code-division multiple access (CDMA, also known as spread spectrum modulation), and the use of packet-based protocols such as the TCP/IP (Transmission Control Protocol/Internet Protocol).

Sirius and XM already use multiplexing to send approximately 100 channels of program entertainment over the spectrum licensed to them by the FCC. XM also uses multiplexing to send real-time weather information to aircraft and other users who have paid for this service. Sirius has promised to add video services and will use multiplexing techniques to send this new content.

Sirius and XM each have approximately 10 Mbps (megabits per second) of digital transmission bandwidth available to them. Using 10 Mbps for illustrative purposes, this data rate can be used to provide 100 program channels at 100 kbps each, but both services make use of the fact that talk channels sound acceptable at lower data rates than music channels and allocate less bandwidth per talk channel. Because classical music and its listeners are even more demanding than other music offerings, classical music channels are often allocated a higher data rate than rock and roll.

Sirius even dynamically allocates its data rate, using different data rates at different times on each channel. For example, a classical music channel which has been allocated a larger than normal data rate can be backed off to a lower data rate when the announcer is telling listeners the details of the next piece to be played. Conversely, a talk channel can be allocated extra data rate when a short piece of music is being played, for example as part of a commercial.

In the present invention such multiplexing techniques are used to communicate the normal program broadcast, additional information (e.g., commercials) for storage at the receiver, and receiver commands (e.g., commands telling the receiver the tier of service to which it is entitled, local database updates, which songs to delete to make room for commercials, which commercials to insert, which commercials to record, etc.). In the case of Sirius and XM, this involves allocating some of their approximately 10 Mbps total data rate for communicating additional information, particularly commercials, needed by the present invention. However, it will also be obvious to one skilled in the art that other channels (e.g., an auxiliary radio channel, a CD-ROM sent by mail, the Internet) can also be used to communicate the additional information required provided that the receiver includes an input port to accept information over one of these other channels. Also, as noted earlier, commercials can be recorded from existing program channels which contain commercials.

Encryption Operations

The preferred embodiment uses NIST's Advanced Encryption Standard (AES) for all required conventional (symmetric) encryption operations. AES is specified in FIPS PUB 197 available from the Government Printing Office. AES allows 128, 192 and 256-bit keys. AES has a 128-bit block size, meaning that plaintext (unencrypted data) is operated on in 128-bit portions to produce 128-bit ciphertext portions, and vice versa.

If a plaintext, other than a key which is to be encrypted, is longer than 128 bits, the plaintext is broken into 128-bit blocks and encrypted using AES in cipher block chaining (CBC) mode as defined in NIST Special Publication 800-38A "Recommendation for Block Cipher Modes of Operation." For example, a content segment (CS) consisting of three minutes of audio encoded at 128 kbps is 23,040,000 bits long and will be broken into 180,000 plaintext content segment blocks, each 128 bits long, denoted $CS_1$, $CS_2$, . . . $CS_{180000}$ which are encrytped into encrypted content segments (ECS's) consisting of 180,000 128-bit blocks $ECS_1$, $ECS_2$, . . . $ECS_{180000}$ via the relation $$ECS_i=E_{KOM}(CS_i+ECS_{i-1}) \text{ for } i=1, 2, \ldots, 180000$$

where $E_K(P)$ denotes AES encryption of the 128-bit quantity P under key K, + denotes the XOR operation (bit-by-bit addition mod-2), KOM is a 128-bit Key Of the Month used to encrypt content segments within a given set (e.g., intended for a given tier of subscribers), and $ECS_0$ is an initialization vector as defined in NIST Special Publication 800-38A "Recommendation for Block Cipher Modes of Operation." The inverse, decrypting operation is $$CS_{i=DKOM}(ECS_i)+ECS_{i-1} \text{ for } i=1, 2, \ldots, 180000$$

where $D_K(C)$ denotes AES decryption of the 128-bit quantity C under key K.

While not used in the preferred embodiment, any keys longer than 128 bits are encrypted using AES's Counter Mode, as described in NIST Special Publication 800-38A "Recommendation for Block Cipher Modes of Operation." Counter mode has the advantage that the resultant ciphertext is the same length as the plaintext, even if the plaintext is not a multiple of the 128-bit AES block size. In contrast, CBC mode pads out any partial plaintext blocks since CBC must act on multiples of the block size.

Keys, such as keys of the month, which are 128 bits in length are encrypted using AES's Electronic Code Book (ECB) Mode, as described in NIST Special Publication 800-38A "Recommendation for Block Cipher Modes of Operation."

User authorization messages are sent monthly to each subscriber's receiver indicating the tier of service to which that user's receiver is entitled and providing one or more keys of the month to give that receiver access to all encrypted content segments included on that tier of service's programs for that month. A user authorization message consists of the following fields:

- a 48-bit field specifying the serial number of the user's receiver;
- a 32-bit field specifying the current date and time;
- a 4-bit field specifying the month for which the authorization is valid;
- a 4-bit field specifying the tier of service to which the user is entitled;
- a 128-bit field specifying the key of the month for the authorized tier of service; and
- a 160-bit field providing a digital signature, produced by the broadcaster, proving that the user authorization message is legitimate.

In the preferred embodiment, each receiver is manufactured with a unique serial number (accessible to its microprocessor) and a 256-bit cryptographic key (hereafter its device key) so that messages can be addressed to a particular receiver and, when appropriate, be encrypted in a manner that only that receiver can decrypt. (In alternative embodiments serial numbers and/or cryptographic keys may be shared by more than one unit, for example when all billed to the same account. In another alternative embodiment, each receiver has mulitple device keys.) Since $2^{48}$ is approximately 280 trillion, a 48-bit serial number allows as many receivers as desired to be manufactured without running out of serial numbers.

A receiver's device key is also used to authenticate information received by the broadcaster from that receiver over the reverse channel, using a message authentication code (MAC) such as NIST's CMAC Mode with AES, specified in NIST Special Publication 800-38B "Recommendation for Block Modes of Operation: The CMAC Mode for Authentication" and available from the US Government Printing Office.

The current date and time, accurate to one second in 100 years, can be specified by a 32-bit number. The month for which the authorization is valid can be specified by a 4-bit number, allowing authorizations up to 16 months beyond the month of the current date and time. Time can either be absolute or relative.

Under the reasonable assumption that there are no more than 16 tiers of service, another 4-bit number can specify the tier of service to which the user is entitled.

A key of the month for the authorized tier of service is a 128-bit quantity and is sent to each receiver encrypted in Electronic Code Book Mode by AES in that receiver's 256-bit device key so that the key of the month cannot be used by receivers other than the one for which the user authorization message was intended. In the preferred embodiment, higher tier subscribers who receiver fewer or no commercials are sent more than one key of the month because program content segments which are replaced by additional information content segments (e.g., commercials) are encrypted in a different key of the month from program content segments that are accessible to lower tiers of subscribers. In embodiments with N tiers of service, this gives rise to the need for N keys of the month, with the lowest tier of subscribers getting only one (lowest value) key of the month, and highest tier subscribers getting all N keys of the month. (In an alternative embodiment, the lowest tier subscribers do not need a key of the month and program content segments accessible to the lowest tier are not encrypted.) The use of multiple keys of the month for higher tier subscribers allows higher tier subscribers to access more program content segments than lower tier subscribers. It also prevents lower tier subscribers from gaining access to unauthorized content even if they hack their receivers and override receiver commands which substitute commercials for some program content.

The 160-bit digital signature is used to prevent opponents from injecting spurious messages which might cause receivers to use an incorrect key of the month, thereby sabotaging the broadcasting service in a form of denial of service attack. (The digital signature is not needed to prevent receivers from accessing tiers of service to which they are not legitimately entitled because the keys of the month for those tiers of service will not be known to an unauthorized receiver). Digital signatures are known in the art and are described for example in NIST's FIPSPUB 186-2 "Digital Signature Standard (DSS)", available on-line at NIST's web site or through the Government Printing Office. FIPSPUB 186-2 requires the use of the Secure Hash Algorithm (SHA) described in NIST's FIPSPUB 180-1, "Secure Hash Standard", also available online at NIST's web site or through the Government Printing Office. The variant of SHA described in FIPSPUB 180-1 is called SHA-1 since it is slightly different from, and more secure than, the original FIPSPUB 180's SHA without the -1 suffix. While the DSS allows variants, the preferred embodiment uses 160-bit signatures as specified therein. The preferred embodiment uses public key cryptography's digital signatures instead of conventional cryptography's message authentication codes (MAC's) to avoid placing the broadcaster's secret key in any receiver. This way, even if an opponent takes apart a receiver and learns the broadcaster's public key used to authenticate the digital signature, the opponent is unable to generate new digital signatures from it. Alternative embodiments can use other digital signatures (e.g., RSA) or MAC's.

Reasons for Different Key Lengths

As noted above, device keys are 256 bits long and keys of the month are 128 bits long. There are two reasons for these different key lengths. First, the value of the information protected by each class of key is different and the use of longer keys to protect more valuable data is standard practice. In order of their economic value the keys are:

256-bit device keys protect keys of the month, 128-bit keys of the month protect content segments.

Second, as will be described in detail later, the present invention is designed to make sure that the two classes of protected data (keys of the month and content segments) are directed only to those portions of the receiver where they are intended to go. Using different key sizes prevents an opponent who is able to hijack less secure portions of the receiver (e.g., its microprocessor) from issuing commands which might allow him to see a class of protected data in a portion of the receiver where it is not intended. For example, if the key size were the same for both classes of protected data, the opponent might be able to trick the cryptoprocessor into decrypting a key of the month as if it were a content segment and thereby have it appear in the less secure portion of the receiver where decrypted content segments reside. In that way, he might then be able to learn the key of the month for dissemination to a large group of pirate users not authorized to have access to that tier of service.

Missing Content Segments

As described in detail later, the preferred embodiment uses a Reed-Solomon erasure-correcting code to increase the probability that each receiver has received and stored in memory all addditional information content segments (e.g., commercials) before they are needed. Even so, there is a chance that a receiver command sent by the broadcaster will instruct a receiver to use an addditional information content segment from memory that has not yet been received, for example due to a prolonged signal dropout. The preferred embodiment is designed so that such a missing content segment causes little or no disruption to the listening experience.

For example, if a receiver command instructs a receiver to substitute a specific commercial for a portion of the program content and that commercial is not yet available at the receiver, then an earlier commercial for the same product which is in memory is used instead. In the preferred embodiment, commercials for a given product are numbered consecutively, in which case the receiver uses the highest numbered commercial for a specified product if the specified commercial is missing. If no commercials for the specified product are available at the receiver, the receiver use a commercial for the same advertiser. If none of those are available, the receiver uses a sequence of generic station announcements usable on any channel and that were stored in nonvolatile memory at the time the receiver was manufactured. Software at the receiver chooses the sequence of generic station announcements to minimize dead space or overlap and uses fade-in-fade-out techniques on any overlap of content segments thus produced.

BRIEF DESCRIPTION OF THE DRAWINGS

The foregoing and other objects of the invention will be more clearly understood from reading the following description of the invention in conjunction with the accompanying drawings in which.

DETAILED DESCRIPTION OF THE DRAWINGS

Having generally described the present invention, a further understanding can be obtained by reference to the specific preferred embodiments, which are provided herein for purposes of illustration only and are not intended to limit the scope of the appended claims.

Figure 1:
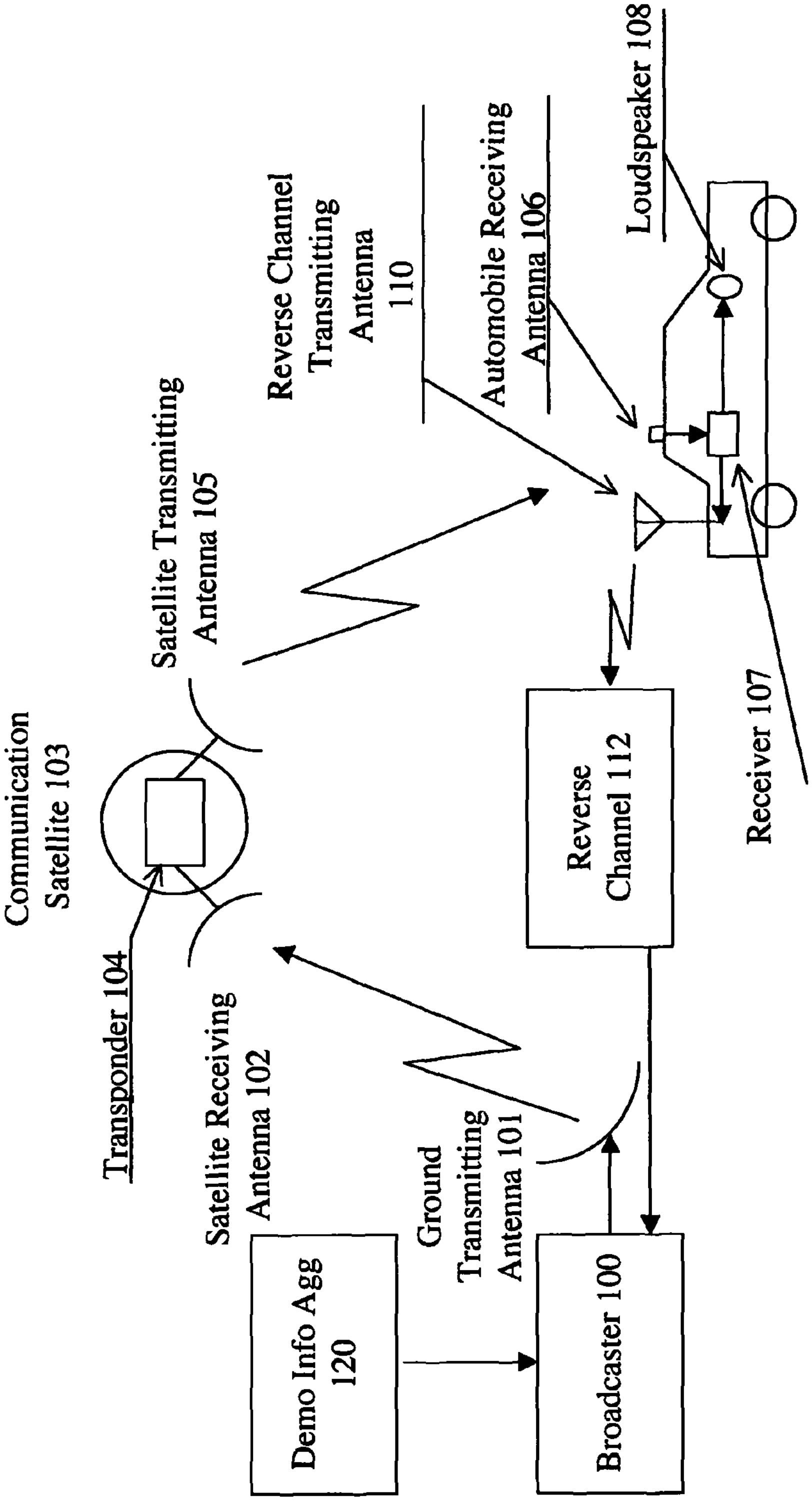
FIG. 1 is a schematic diagram illustrating a broadcast satellite radio system.

FIG. 1 illustrates a broadcast satellite radio service in which broadcaster 100 sends a signal to ground transmitting antenna 101. The signal sent from ground transmitting antenna 101 is received by satellite receiving antenna 102 located on communication satellite 103. The signal received by satellite receiving antenna 102 is processed (e.g., frequency translated and amplified) in transponder 104 located within communication satellite 103. The output of transponder 104 is fed to satellite transmitting antenna 105 for broadcast to subscribers.

While a typical system will have thousands or millions of subscribers, both stationary and mobile, for illustrative purposes FIG. 1 shows one mobile subscriber in an automobile with roof mounted automobile receiving antenna 106. The signal received by automobile receiving antenna 106 is input to receiver 107 to produces an audio frequency signal that is output by loudspeaker 108.

The preferred embodiment of the present invention includes a reverse channel 112 for communicating information from receiver 107 to broadcaster 100, utilizing reverse channel transmitting antenna 110. While reverse channel 112 can be any channel known in the art, in a mobile environment such as that depicted in FIG. 1, the preferred embodiment reverse channel 112 is a cell phone channel; and in a fixed environment, the preferred embodiment reverse channel 112 is the Internet, in which case reverse channel transmitting antenna 110 is not needed.

The preferred embodiment also includes a demographic information aggragator 120 (abbreviated as Demo Info Agg 120 in FIG. 1) which provides demographic information to broadcaster 100 which allows finely targeted advertising to individual subscribers based on on-line searches, on-line browsing habits, buying patterns, and credit reports.

While FIG. 1 shows a typical realization, clearly, other possibilities, known in the art are possible within the spirit of the present invention. For example, loudspeaker 108 could be replaced by a headset, or a terrestrial repeater could be transmitting the signal received by automobile receiving antenna 106. The receiving antenna 106, receiver 107, and loudspeaker 108 can be located in a home, office, or other location.

For the sake of clarity, while these and other modifications to the figures are possible and will be obvious to one skilled in the art, the remainder of this description will deal solely with the system shown in FIG. 1, it being understood that such modifications are included in the scope of the present invention. Similarly, for sake of clarity, aspects of the system not germane to the present invention and well understood in the art, are not shown.

Figure 2:
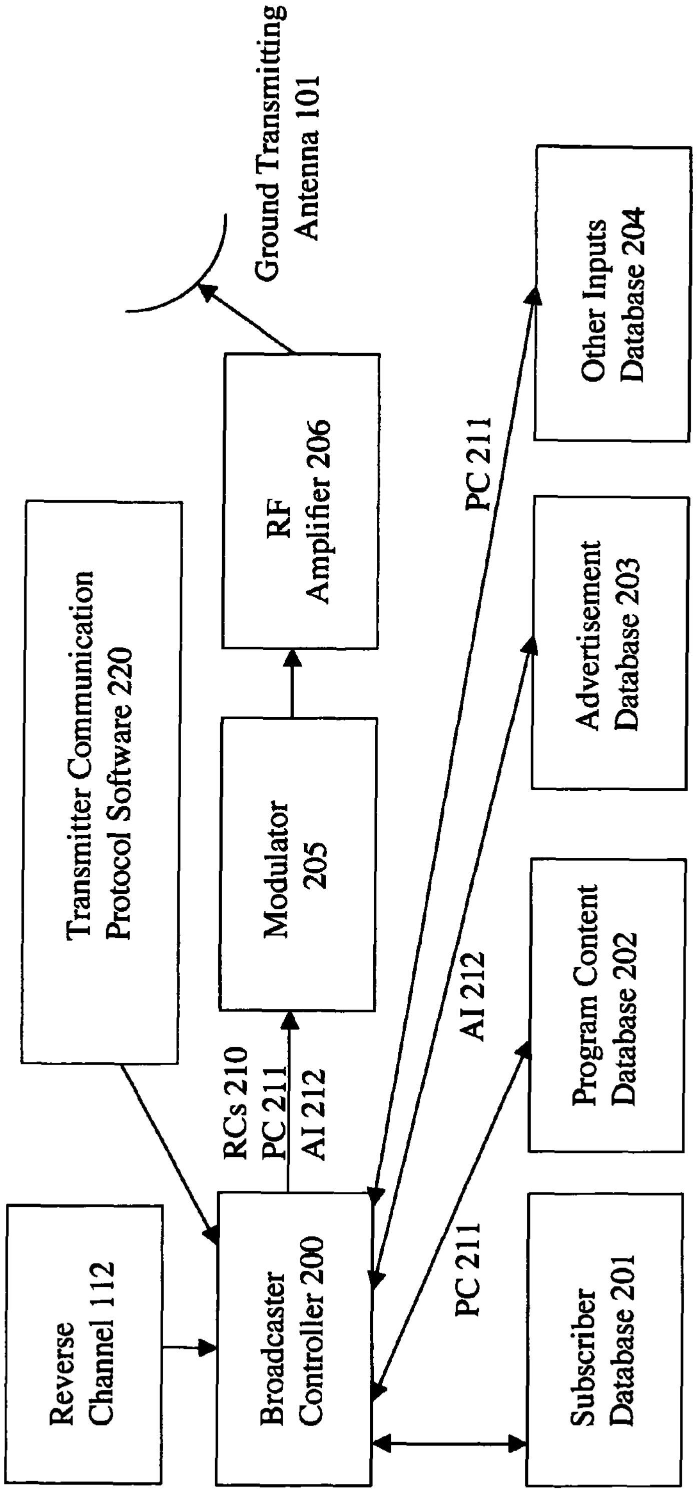
FIG. 2 is a block diagram of an exemplary embodiment of a radio transmitter.

FIG. 2 is a block diagram providing a more detailed view of broadcaster 100 of FIG. 1. Broadcaster controller 200 accesses and updates information, preferably in digital form, in multiple databases. While the number and type of databases can vary, for purposes of illustration, FIG. 2 shows a subscriber database 201, a program content database 202, an advertisement database 203, and an other inputs database 204. Broadcaster controller 200 also receives information from reverse channel 112 such as the listening habits of different subscribers.

Subscriber database 201 contains a listing of unique identifying numbers (e.g., serial numbers) built into each receiver 107; the tier of service authorized for each receiver 107 (e.g., with or without commercials); demographic information for the user(s) of each receiver 107 (e.g., zip code, occupation, etc., as well as which channels are listened to, as communicated via reverse channel 112); and a list of device keys stored in each receiver 107, used to encrypt certain information communicated to and from broadcaster 100 and receiver 107. The device keys can be for a conventional (symmetric) cryptosystem such as the Data Encryption Standard (DES) or the newer Advanced Encryption Standard (AES), or for a public key system such as RSA or the Digital Signature Standard (DSS). The preferred embodiment uses an AES device key. Also in the preferred embodiment, the device key stored in a particular receiver 107 will be different from the device keys stored in all other receivers 107, and subscriber data base 201 includes information supplied by a third party, such as a web portal or search engine company, to allow finely targeted demographic advertising.

Program content database 202 contains program content 211, abbreviated PC 211 in FIG. 2 and consisting in the preferred embodiment of music, talk shows, etc., which form the program content of the approximately one hundred channels offered by broadcaster 100. (Alternative embodiments can have as few as one channel or more than one hundred.) Program content 211 is divided into program content segments, each identified by a unique 32-bit program content segment number header. Program content segment numbers are used by broadcaster controller 200 to designate which program content segments are to be deleted to make room for commercials and other additional information for various tiers of subscribers.

Program content database 202 also contains information communicated over reverse channel 112 telling broadcaster 100 statistics on the listening history of receiver 107. (This information can be obtained for each receiver or, at reduced cost but with some sampling error, on a subset of all receivers.) When combined with demographic information contained in subscriber database 201, this eliminates the need for Arbitron, Nielsen or similar outside ratings agencies. Ratings information derived via reverse channel 112 is also available on an almost real-time basis, whereas outside agencies often have long delays in providing ratings.

Other inputs database 204 is optional and, for example, can contain real-time studio broadcasts or sporting events which forms a part of program content 211.

Advertisement database 203 contains additional information 212 to be transmitted to and stored by receiver 107. Additional information 212 includes commercials and other material that are substituted for a portion of program content 211 for one or more tiers of subscribers. To facilitate such substitution, additional information 212 is divided into additional information content segments, each identified by a unique 32-bit additional information content segment number header. Additional information content segment numbers are used by broadcaster controller 200 to designate which additional information content segments are to be inserted in place of deleted program content segments for various tiers of subscribers. Additional information content segments are communicated using transmitter communication protocol software 220. (Program content segments may also be communicated using transmitter communication protocol software 220 if pre-existing receivers can support that protocol.)

For billing advertisers, advertisement database 203 also stores information received over reverse channel 112 indicating how often each commercial has been listened to by various demographic subsets of subscribers.

Based on the contents of databases 201, 202, 203 and 204, broadcaster controller 200 generates receiver commands 210 (abbreviated RCs 210 in FIG. 2) which are transmitted to the plurality of receivers 107 along with program content 211 (abbreviated PC 211 in FIG. 2) and additional information 212 (abbreviated AI 212 in FIG. 2).

Receiver commands 210 include the tier of service to which a subscriber's receiver 107 is entitled, which additional information content segments are to be substituted for which program content segments for which demographic subsets of subscribers (including the possibility of subsets consisting of just one subscriber, and subsets that consist of one or more entire tiers of subscribers). Program content 211 is the normal program for each channel of entertainment, and additional information 212 consists primarily of commercials, but also filler material, and in some embodiments demographic data.

Broadcaster controller 200 uses multiplexing techniques known in the art (e.g., see Patsiokas U.S. Pat. No. 6,785,656) to combine receiver commands 210, program content 211 and additional information 212 into a digital bit stream which is presented to modulator 205 so that the digital bit stream can be modulated onto an RF carrier signal. This modulated signal is then amplified by RF amplifier 206 and transmitted to communication satellite 103 via ground transmitting antenna 101.

Figure 3:
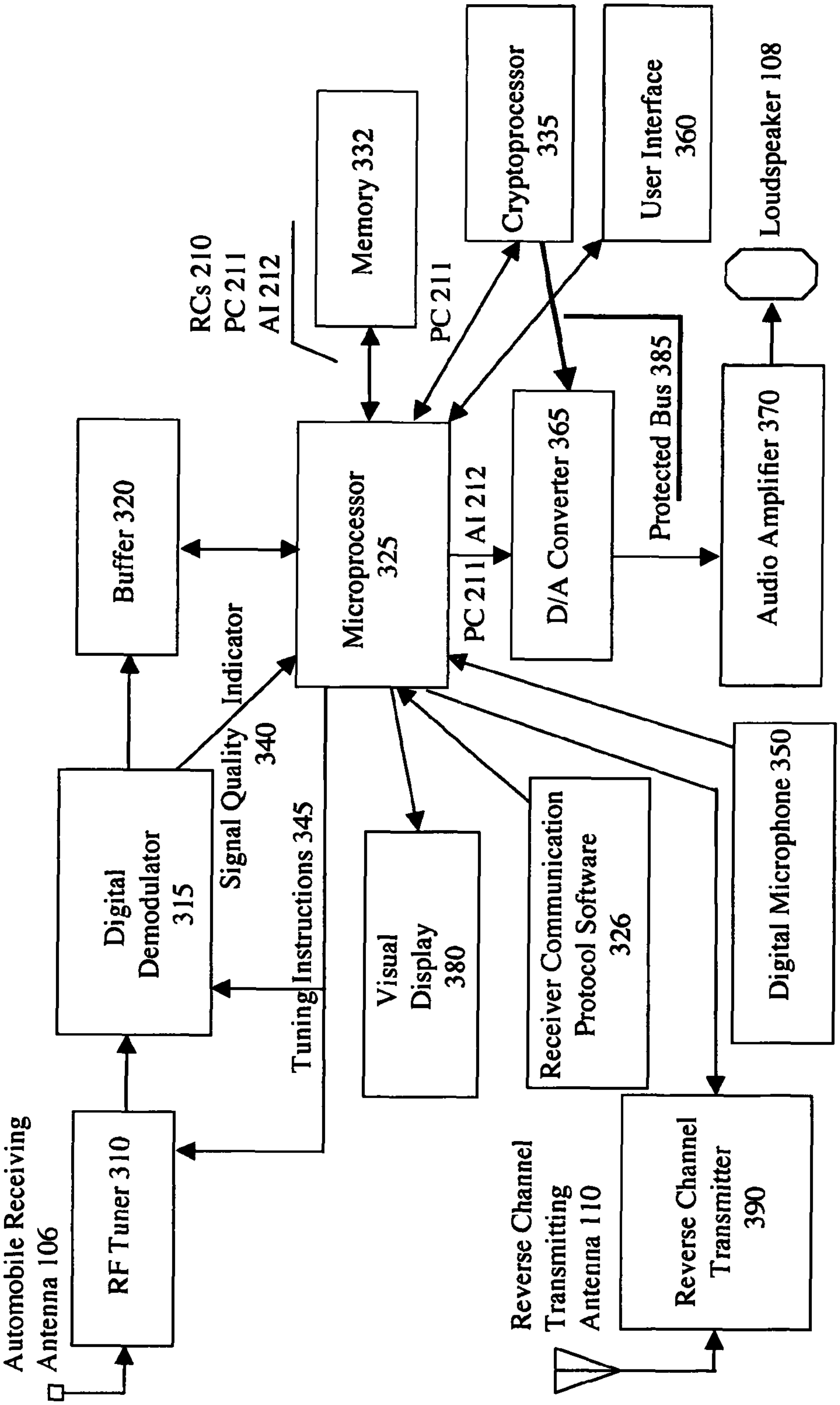
FIG. 3 is a block diagram of an exemplary embodiment of a receiver.

FIG. 3 is a block diagram providing a more detailed view of receiver 107 of FIG. 1. Automobile receiving antenna 106 is connected to RF tuner 310 so that an appropriate signal strength is presented to digital demodulator 315. Filtering, to minimize the effects of out-of-band signals also takes place in RF tuner 310 and/or digital demodulator 315. Digital demodulator 315 outputs a digital bit stream to buffer 320. Digital demodulator also outputs a signal quality indicator 340 to microprocessor 325, for example the signal-to-noise ratio, so that microprocessor 325 knows when good and bad data are likely to be received. In alternative embodiments signal quality indicator 340 can be created by RF tuner 310 or microprocessor 325. For example, as described later, microprocessor 325 uses an error-correcting and detecting code on each received packet. Also also described later, if this code indicates an uncorrectable error, microprocessor 325 has an extremely strong indication that signal quality was poor.

Using techniques known in the art (e.g., see Patsiokas U.S. Pat. No. 6,785,656), packet header or similar information allows microprocessor 325 to demultiplex the digital bit stream into separate substreams representing program content 211, receiver commands 210, and additional information 212 (including commercials). Receiver commands 210 (see FIG. 2) transmitted by broadcaster 100 divide each demultiplexed channel of program content into program content segments, each identified by its associated program content segment number so that other receiver commands 210 can specify which program content segments are to be deleted to make room for additional information content segments such as commercials.

Optionally, microprocessor 325 can provide tuning instructions 345 to RF tuner 310 and digital demodulator 315, telling them which program channel(s) of the received signal to demodulate. For example, if the subscriber has specified that she wants to listen to the 60's music channel, microprocessor 325 can provide this information to the digital demodulator 315 so that it need not expend any resources decoding content that is not of interest. In embodiments where RF tuner 310 and digital demodulator 315 are capable of demodulating more than one channel at a time, microprocessor 325 provides tuning instructions 345 instructing them to tune to and demodulate the current channel specified by the subscriber plus one or more other channels that, based on past behavior, are likely to be requested in the future. The other demodulated channels are stored in memory 332 for use in non-real-time listening.

Microprocessor 325 directs a first substream of the received bit stream to memory 332 consisting of flash memory in the preferred embodiment, but in alternative embodiments, consisting of any form of memory or any combination of memories (e.g., RAM and a hard disk drive). The first substream stored in memory 332 includes a subset of receiver commands 210, a subset of program content 211 (for use in non-real-time applications), and additional information 212 such as commercials and "filler" content used to fill any dead space after commercials are inserted for lower tier subscribers. Filler content includes short segments of music, channel announcements (e.g., "You're listening to the 60's channel.") DJ patter, etc.

Microprocessor 325 directs a second substream of the received bit stream to D/A converter 365 to be converted into an analog signal for amplification by audio amplifier 370 and output to loudspeaker 108. This second substream of the received bitstream includes unencrypted program content 211 that the subscriber has requested, for example unencrypted portions of the 60's music channel.

Microprocessor 325 directs a third substream of the received bit stream to cryptoprocessor 335. This third substream of the received bitstream includes encrypted program content 211 that the subscriber has requested, for example encrypted portions of the 60's music channel. This third substream of the received bitstream also includes other encrypted data, such as encrypted keys of the month (described later) contained in certain receiver commands 210 known as user authorization messages.

A fourth substream of the received bitstream, are receiver commands 210 retained by microprocessor 325. Not all of the four described substreams are necessary for the present invention. For example, the second substream (consisting of unencrypted content segements) is absent in alternative embodiments in which all content segments are encrypted.

If receiver commands 210 indicate that the subscriber is in a lower tier and is therefore to receive commercials in place of part of program content 211 in the second and/or third substreams, receiver commands 210 tell microprocessor 325 which portion of the program content substream to delete to make room for commercials and which commercials (and other additional information such as filler content) are to be inserted. In an alternative embodiment, microprocessor 325 can participate in or make the decision on which program content segments to delete and which additional information content segments to insert.

When receiver commands 210 tell microprocessor 325 that one or more additional information content segments are to be substituted for one or more program content segments, microprocessor 325 accesses the specified additional information content segments stored in memory 332 and substitutes the bit sequence representing the specified additional information content segments for the specified portion of the program content bitstream. Lower tier listeners thus hear only part of the normal content interrupted by commercials, while higher tier listeners hear all of the program content for the channel that they have selected, without any commercial interruptions.

In the preferred embodiment, receiver commands 210 that instruct microprocessor 325 to substitue one or more additional information content segments for one or more program content segments are of the following form:

(SUBSET, CH, T1, T2, N1, N2, $P_1$, $P_2$, . . . , $P_{N1}$, $AI_1$, $AI_2$, . . . , $AI_{N2}$)

SUBSET delimits the set of subscribers to which the receiver command 210 applies, using any of the techniques known in the art. For example, a single subscriber can be specified by the unique identifying number of his receiver 107; an entire tier of subscribers can be specified by their tier number; and the set of subscribers with a given billing zip code can be specified by their zip code. A prefix within the SUBSET field specifies which method of specifying a subset (e.g., zip code vs. a receiver's unique identifying number) is being used. For example, when an 8-bit portion of SUBSET is reserved, then 256 different kinds of descriptions can be used with 00000000 specifying that the rest of SUBSET is the unique identifying number of a receiver 107; with 00000001 specifying that the rest of SUBSET is a zip code; etc. The SUBSET field is made large enough so that the longest possible specification can be accommodated.

CH is the channel number to which receiver command 210 applies (alternative embodiments can specify a set of channels), T1 is the start time of the program material to be deleted, T2 is the end time of the program material to be deleted, N1 is the number of program content segments specified to be delted, N2 is the number of additional information content segments specified to be substituted (inserted), $P_1$ is the program content segment number of the first program content segment specified to be deleted, $P_2$ is the program content segment number of the second program content segment specified to be deleted, . . . , $P_{N1}$ is the program content segment number of the last program content segment specified to be deleted, $AI_1$ is the additional information content segment number of the first additional information content segment specified to be substituted, $AI_2$ is the additional information content segment number of the second additional information content segment specified to be substituted, . . . and $AI_{N2}$ is the additional information content segment number the last additional information content segment specified to be substitured.

Periodically, broadcaster 100 transmits a real-time clock signal as a sequence of receiver commands 210 so that microprocessor 325 knows when T1 and T2 occur. Microprocessor 325 checks that the program content segments in the time interval T1-T2 have program content segment numbers (included as part of the header of the transmitted program content segments) equal to $P_1, P_2, \ldots, P_{N1}$. If a discrepancy is observed, microprocessor 325 ignores receiver command 210 and neither deletes any program content nor substitutes any additional information content based on the erroneous receiver command 210. Such a discrepancy is logged as an error condition in an error log in memory 332.

If no discrepancy is observed, microprocessor 325 checks that the specified additional information content segments $AI_1, AI_2, \ldots, AI_{N2}$ are in memory 332. If one or more of the specified additional information content segments are missing, microprocessor 325 substitutes alternative additional information content segments for the missing specified additional information content segments, using the techniques described earlier (e.g., using an older commercial for the same product), and logs the problem in error log in memory 332. Microprocessor 325 then carries out receiver command 210 and logs this event in a commercial log in memory 332.

While this substitution is in progress, microprocessor 325 monitors the audio signal picked up by digital microphone 350 (i.e., it includes a D/A converter) and uses pattern recognition techniques (signature analysis) known in the art to determine whether or not the additional information content segment(s) specified by receiver command 210 were output through loudspeaker 108. Such monitoring provides assurance that commercials really were played and that the subscriber did not turn down the volume of receiver 107 or switch to another audio source (e.g., a CD) during the substituted additional information content segments. The results of this monitoring are also recorded in the commercial log in memory 332.

The preferred pattern recognition/signature analysis technique is for microprocessor 325 to compute the mean squared error between the signal output by digital microphone 350, normalized to have unit power, and the signal representing the additional information content segment (typically an advertisement) specified by receiver command 210, also normalized to have unit power. Because the time series representing these two signals is subject to an unknown delay, the mean squared error is computed on the Fourier series amplitude spectrum of these same two normalized signals. (The Fourier series amplitude spectrum of a signal is essentially invariant under small time shifts.)

Non-real-time playback of audio broadcasts is finding wider application as described, for example, by Marko in U.S. Pat. No. 6,564,003 and Hellman in U.S. Provisional Patent Application Ser. No. 60/698786 "Storage-Based Media Broadcasting and Distribution System." When audio broadcasts are played back from memory in non-real-time, the subscriber usually has the option of skipping or repeating content segments. The present invention is applicable both to real-time and non-real-time audio broadcasts. When used with non-real-time audio broadcasts, the preferred embodiment records the real-time clock signals transmitted as receiver commands 210 by broadcaster 100 and associates them with the corresponding point (bit or byte) within the content segment being broadcast at that point in time. Thus a receiver command 210 of the form specified above $$(CH, T1, T2, N1, N2, P_1, P_2, \ldots, P_{N1}, AI_1, AI_2, \ldots, AI_{N2})$$

can be used by the present invention in both real-time and non-real-time (recorded) applications. In non-real-time use, T1 and T2 refer to the time of broadcast, not the time of playback.

User interface 360 includes

- visual output (via visual display 380) to communicate information to the user;
- audio output (via D/A converter 365, audio amplifier 370 and loudspeaker 108) to communicate information to the user and to output program content segments and additional information content segments (collectively "content segments") for audio reproduction;
- a an ON/OFF switch;
- a volume control;
- a channel selector;
- ten preset buttons for rapidly choosing among ten channels set by the user (e.g., by holding a preset button for more than two seconds to set it to the currently active channel);
- a band button for moving the ten preset buttons to one of three bands denoted A, B, and C, thereby expanding the presets from ten to thirty with the addition of just one button;
- a pause button which, when depressed momentarily, tells receiver 107 to pause playing the current content segment (also muting receiver 107) and, when depressed again, tells receiver 107 to resume playing the current content segment;
- a skip button which, when depressed momentarily, tells receiver 107 to skip the remainder of the current content segment or, when held down, to fast forward through the current content segment (the skip button is disabled during certain content segments, such as commercials);
- a repeat button which, when depressed momentarily, tells receiver 107 to return to the beginning of the current content segment or, when held down, to rapidly rewind back through the current content segment;
- a menu button to bring up menus for various user preferences (e.g., changing display characteristics, etc.); and a buy button which, when activated, indicates the user wishes to purchase the audio content currently being played.

The pause, skip and repeat buttons may be absent from a receiver 107 designed solely for real-time broadcast reception.

The skip and fast forward operations are disabled when certain content segments such as commercials are being played. These content segments are specified by setting a DoNotSkip bit in the content segment header to 1, while all other content segments have this bit set to 0. When the skip button is depressed, microprocessor 325 checks the DoNotSkip bit of the currently playing content segment and only carries out the requested operation if that bit is set to 0. To prevent the subscriber from thinking that his receiver 107 is broken when it fails to respond to the skip button, microprocessor 325 causes a message to be communicated to the user (e.g., by playing an audio announcement) which states that the skip button is currently disabled and suggesting that the subscriber purchase a higher tier subscription, after which microprocessor 325 causes the interrupted content segment to restart from its beginning. Optionally, microprocessor 325 can also cause commercials which are muted to be replayed until they are loud enough to be detected by digital microphone 350.

Microprocessor 325 maintains a program log in memory 332 which tracks which program channels were listened to and for how long. The program log also maintains information tracking which content segments were repeated or rewound (via the repeat button of user interface 360) and which content segments were skipped or fast forwarded (via the skip button of user interface 360). This part of the program log is used to produce ratings for each channel, programs within a channel, and content segments within a program.

Microprocessor 325 maintains a purchase log in memory 332 which tracks which audio content segments have been purchased by the subscriber.

Periodically, microprocessor 325 causes the error log, commercial log, program log, and purchase log stored in memory 332 along with receiver 107's unique identifying number (e.g., serial number) to be transmitted to broadcaster 100 via reverse channel transmitter 390 and reverse channel transmitting antenna 110. Receipt of the error log allows broadcaster 100 to improve and debug the system. Receipt of the commercial log allows broadcaster 100 to bill advertisers, including billing based on subscriber demographics. Receipt of the program log allows almost real-time ratings to be assigned to each channel, to each program within a channel, and to each content segment within a program. Receipt of the purchase log allows broadcaster 100 to bill subscribers for purchased music, to send keys or other unlocking mechanisms to allow access to purchased music, and to make royalty payments to music publishers.

The channel log also provides additional demographic information (e.g., subscribers who listen primarily to classical music have different statistical demographics from those who listen primarily to hard rock) to broadcaster 100 which is used in choosing which additional information content segments, including commercials, to substitute for each subscriber who is in a tier of service which receives additional information content segments.

Figures 4, 5:
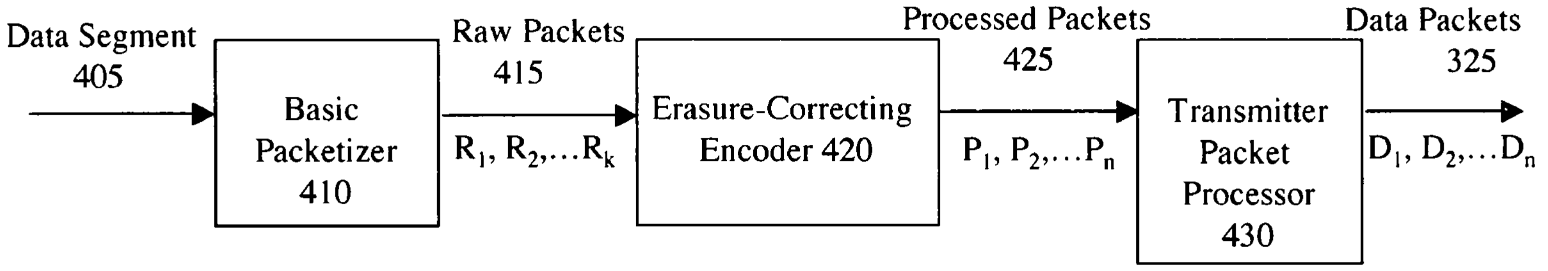
FIG. 4 is a block diagram of an exemplary embodiment of a transmitter communication protocol.
FIG. 5 depicts the structure of an exemplary embodiment of an erasure-correcting code.

FIG. 4 depicts the preferred embodiment of transmitter communication protocol software 220. A data segment (e.g., a commercial) is operated on by basic packetizer 410 to output a sequence of raw packets 415, denoted $R_1, R_2, \ldots R_k$. For example, if data segment 405 consists of a three minute audio content segment encoded at 128 kbps, it is 2,880,000 bytes (2.88 MB) long. The packet length utilized by basic packetizer 410 is optimized based on the characteristics of the satellite radio channel over which the packets will be sent, with a 10 kilobyte (10 kB) packet length being typical. Such a packet is 80 kbits long and takes slightly over half a second to send at a typical data rate of 150 kbps. This is short enough that a fade out (as in driving through a null in the signal) during transmission of a packet is not likely, yet long enough that packet overhead, discussed below, is not an undue burden. Under these assumptions, the 2.88 MB data segment 405 is broken into two hundred eighty-eight raw packets 415 denoted $R_1, R_2, \ldots R_{288}$, each 10 kB long, so that k=288.

Erasure-Correcting Code

Raw packets 415 are encoded by erasure-correcting encoder 420 to produce processed packets 425, denoted $P_1, P_2, \ldots P_n$. In the preferred embodiment, processed packets 425 are the same length as raw packets 415 but n>k. To a first approximation, the satellite radio channel is either error-free (or has few enough errors that the forward-error-correcting code, or FEC, discussed later can correct them) or totally noisy. The essentially error-free state occurs when receiver 107 has a clear view of satellite transmitting antenna 105, while the totally noisy state occurs when receiver 107 is in a garage or tunnel or otherwise cannot see satellite transmitting antenna 105. The totally noisy state also occurs when receiver 107 is turned off. However, the preferred embodiment uses low power electronics and/or a backup battery so that receiver 107 can be turned on all the time for purposes of receiving the portion of the bitstream to be stored in memory 332. This "totally error-free or totally noisy" approximation to the satellite radio channel is an erasure channel (i.e., receiver 107 knows when errors can occur). A minor exception is the few packets that occur at the transitions between these two states. They are only partially erased but, in the preferred embodiment, are treated as total erasures.

Any erasure-correcting code known in the art can be used by erasure-correcting encoder 420, with the preferred embodiment using Reed-Solomon codes over $GF(2^{16})$. Some alternative embodiments are random codes, Tornado codes, and Luby Transform codes. See, for example, U.S. Pat. Nos. 6,614,366, 6,486,803, 6,411,223, 6,373,406, 6,320,520, and 6,307,487 and US Patent Applications 2001/0019310, 2002/0087685, 2002/0107968, 2002/0129159, 2002/0190878, 2003/0058958, 2003/0226089, 2004/0021588, 2004/0075593, and 2004/0101274. Another alternative embodiment uses the Reed-Solomon code in burst-error-correcting mode rather than erasure-correcting mode, which embodiment makes better use of partially erased packets.

Reed-Solomon codes are used to correct erasures on audio CD's. Erasures on audio CD's occur in blocks where a manufacturing defect or a speck of dust obliterates a small area of the CD. This small area, however, contains a large number of bits. The defect can be identified either by the SNR at the analog level or by error detecting bits after demodulation, transforming the problem into one of erasure correction. CD erasure correction uses a Reed-Solomon code over $GF(2^8)$ coupled with interleaving.

In the case of transmission of data packets over the satellite radio channel, erasures will mostly be packets lost due to the receiver 107 being unable to see satellite transmitting antenna 105 and again can be identified either by SNR at the analog level (e.g., signal quality indicator 340 of FIG. 3) and/or by error-correcting/detecting bits after demodulation. Reed-Solomon codes are in widespread use so that custom IC decoders (e.g., Philips Semiconductors part number SAA7207H_C1) are available and can be integrated into the preferred custom chip implementation of receiver 107's electronics. See also De Marzi et al U.S. Pat. No. 6,594,794 "Reed-Solomon decoding of data read from DVD or CD supports" and Huang U.S. Pat. No. 6,061,760 "Controller circuit apparatus for CD-ROM drives."

Unlike audio CD erasure correction, the preferred embodiment uses Reed-Solomon codes over $GF(2^{16})$ and is able to eliminate interleaving because of the stronger erasure-correcting properties of the larger field. Codeword symbols are 16 bits (2 bytes) long, and the block length of the code is $(2^{16}-1)=65{,}535$. For reasons described below, this code will usually be shortened by only sending some of the 65,535 possible symbols.

FIG. 5 depicts the structure of the preferred Reed-Solomon encoding performed by erasure-correcting encoder 420 on a 2.88 MB data segment 405, broken into 288 packets with 10 kB in each packet, such as the three minute audio content segment considered above. Since the Reed-Solomon code operates on symbols consisting of 2 bytes each, each 10 kB packet is 5,000 symbols long and is shown as a row in FIG. 5. The first raw packet 415 is the same as the first processed packet 425 (i.e., $R_1=P_1$) and consists of the first 10 kB or 5,000 2-byte-symbols of the 2.88 MB data segment 405. The second raw packet 415 is the same as the second processed packet 425 (i.e., $R_2=P_2$) and consists of the next 10 kB of the 2.88 MB data segment 405. The same is true up to and including the $288^{th}$ packet, which consists of the last 10 kB of the 2.88 MB data segment 405. The $289^{th}$ through $65535^{th}$ processed packets 425 (i.e., $P_{289}$ through $P_{65535}$) are functions of the 2.88 MB data segment 405 and, in general, are not equal to any raw packets. Rather, they are formed by treating each column of FIG. 5 as a Reed-Solomon codeword over $GF(2^{16})$, with each column encoded by the same Reed-Solomon encoder.

When a Reed-Solomon code with the above parameters is used on an erasure channel it is capable of recovering all 288 information symbols in a column when any 288 of the transmitted symbols in that same column have been received. Thus for example, the first column of FIG. 5 consists of the Reed-Solomon codeword $(s_{1,1}, s_{2,1}, s_{3,1}, \ldots s_{65535,1})$ with information symbols $(s_{1,1}, s_{2,1}, s_{3,1}, \ldots s_{288,1})$, and any 288 of the 65,535 encoded symbols $(s_{1,1}, s_{2,1}, s_{3,1}, \ldots s_{65535,1})$ determine the information symbols $(s_{1,1}, s_{2,1}, s_{3,1}, \ldots s_{288,1})$. The same is true for each column, so any 288 processed packets 425 determine the 288 raw packets 415 which constitute the 2.88 MB data segment 405. Reed-Solomon codes are optimal in this application since it is impossible to recover 2.88 MB of information with less than 2.88 MB of received data.

Luby et al (e.g., U.S. Pat. Nos. 6,614,366, 6,486,803, 6,411,223, 6,373,406, 6,320,520, and 6,307,487 and US Patent Applications 2001/0019310, 2002/0087685, 2002/0107968, 2002/0129159, 2002/0190878, 2003/0058958, 2003/0226089, 2004/0021588, 2004/0075593, and 2004/0101274) have developed other erasure-correcting codes sometimes called Luby Transform (LT) codes or digital fountain codes. These codes may require less decoding effort than Reed-Solomon codes, but at the expense of being slightly suboptimal in that they typically require 1-10% more than 2.88 MB of received data to reconstruct the 2.88 MB data segment 405. The preferred embodiment of the present invention uses Reed-Solomon codes because:

- Bandwidth is a scarce resource and is likely to become even dearer relative to computational costs, making the bandwidth optimal Reed-Solomon codes a better choice than the computationally more efficient digital fountain codes.
- Because the columns of FIG. 5 are all encoded with the same Reed-Solomon code and packets are either received error-free or erased, the decoding effort can be amortized over the 5,000 rows of FIG. 5, effectively dividing most of the computational burden by a factor of 5,000. This greatly reduces the advantage of more computationally efficient, but less bandwidth efficient codes.

Different strategies are used by transmitter communication protocol software 220 for different types of data segments 405 and, in particular, to determine the times, if any, that transmitter communication protocol software 220 transmits processed packets 425, $P_1$-$P_{65535}$. (For clarity of exposition, it will sometimes be said that transmitter communication protocol software 220 transmits packets whereas, to be precise, it causes them to be transmitted by modulator 205 and RF amplifier 206. Also for clarity of exposition, one or more processed packets 425 $\{P_i\}$ will sometimes be referred to merely as packets $\{P_i\}$.)

First consider the case where the 2.88 MB data segment 405 consists of a three-minute audio content segment that is of low priority (e.g., a commercial that is to be used a week or more in the future). Transmitter communication protocol software 220 first transmits $P_1$-$P_{289}$, the first 289 rows depicted in FIG. 5. When transmitting all but the last such packet, $P_{289}$, this strategy is no different from the simple method of transmitting data segment 405 with no encoding (other than that provided by transmitter packet processor 430 of FIG. 4, discussed in the section "Packet Overhead" below) since, as shown in FIG. 5, $P_1$-$P_{288}$ constitute the unencoded 2.88 MB song (the 288 raw packets $R_1$-$R_{288}$). The last packet of this first transmission, $P_{289}$, is redundant and is only of value if one or more of packets $P_1$-$P_{288}$ are erased (e.g., if receiver 107 cannot see satellite transmitting antenna 105 during part of this transmission).

If receiver 107 can see satellite transmitting antenna 105 at the time of these transmissions and at most one packet of $P_1$-$P_{289}$ is erased by a momentary fade (e.g., multipath), then at least 288 of these 289 transmitted processed packets 425 are received. A Reed-Solomon decoder in receiver 107 (stored as software in memory 332 of FIG. 3, or implemented in special purpose hardware in receiver 107) can then recover the 2.88 MB data segment 405 and make it available to receiver 107 whenever a receiver command 210 calls for it to be played.

The redundant $P_{289}$ was included in this first transmission since occasional fades occur on the satellite radio channel. If $P_{289}$ had not been included, a much larger fraction of receivers 107 would not have access to the 2.88 MB data segment 405 based on just this first transmission. Alternative embodiments transmit more than one or no redundant processed packets 425, depending on the characteristics of the satellite radio channel and the time urgency of receiver 107 receiving this data segment 405.

If receiver 107 can see satellite transmitting antenna 105 at the time of these transmissions (of $P_1$-$P_{289}$) but more than one packet of $P_1$-$P_{289}$ is erased by momentary fades, then less than 288 of these 289 transmitted processed packets 425 are received, less than 2.88 MB of information is received, and it is clearly impossible for the Reed-Solomon decoder in receiver 107 to recover the 2.88 MB data segment 405. However, in the case of multiple fades while receiver 107 can see satellite transmitting antenna 105, receiver 107 will typically need only a few additional packets from those not yet transmitted (i.e., $P_{290}$-$P_{65535}$).

If receiver 107 cannot see satellite transmitting antenna 105 at the time of these transmissions (of $P_1$-$P_{289}$), then none of $P_1$-$P_{289}$ are received and receiver 107 knows nothing about the 2.88 MB data segment 405.

After transmitter communication protocol software 220's first attempt to communicate the data segment 405 by transmitting $P_1$-$P_{289}$, it waits 1-2 days before making additional transmissions. The time separation between these transmissions is randomized as opposed to, for example, once every 24 hours since some users will always be out of range of FM transmitter 130 at a particular time of day (e.g., when they are in an underground parking garage during work hours). Transmitter communication protocol software 220's second attempt to communicate the song transmits packets $P_{290}$-$P_{578}$ of FIG. 5. The 289 packets are just as informative about the song as were $P_1$-$P_{289}$ and the Reed-Solomon decoder is able to reconstruct the song from any 288 of the total 578 total packets transmitted in the first and second attempts. Thus, for example, receiver 107 can reconstruct the 2.88 MB data segment 405 if

- receiver 107 could not see satellite transmitting antenna 105 during the first attempted transmission, but loses at most one packet from the second attempted transmission; or
- there were multiple fades during both attempted transmissions, but at least 288 packets are received in total.

Additional attempts at transmitting the 2.88 MB data segment 405 proceed in a similar manner to the first and second. At some point in this process (the third in the preferred embodiment) fewer than 289 packets are sent since most receivers 107 will have received either enough or almost enough packets to reconstruct the 2.88 MB data segment 405.

In the above example, transmitter communication protocol software 220 used only a small fraction of the 65,535 possible packets shown in FIG. 5. Hence erasure-correcting encoder 420 uses a shortened Reed-Solomon code as opposed to a complete Reed-Solomon code. Operating over $GF(2^{16})$ allows a larger number of packets than will be needed in all or almost all situations. Alternative embodiments can operate over smaller or larger finite fields than $GF(2^{16})$.

The above example was illustrative of transmitter communication protocol software 220 transmitting a low priority data segment 405. Transmitter communication protocol software 220 transmits different numbers of packets on each transmission attempt, depending on the time urgency of data segment 405, bandwidth availability, characteristics of the satellite radio channel, etc. If a 2.88 MB data segment 405 had a high time urgency (e.g., a commercial for which the advertiser is paying a premium and which needs to air the next day), more than 289 packets are sent on the first attempt to allow reconstruction with more than one erased packet, and additional attempts at transmission are done within hours, rather than the 1-2 days of the former example.

Transmitter Packet Processing

Transmitter packet processor 430 of FIG. 4 operates on processed packets 425 ($P_1, P_2, \ldots P_n$) to produce data packets 435, denoted $D_1, D_2, \ldots D_n$. Data packets 435 are then transmitted to receivers 107 at the times specified in the immediately preceding section using modulator 205, RF amplifier 206, and ground transmitting antenna 101 of FIG. 2 via the satellite radio channel.

Each data packet 325 is slightly longer than each processed packet 425 due to overhead introduced by transmitter packet processor 430. In the preferred embodiment the overhead is contained in a packet header which consists of:

- an 11-bit Barker code synchronization field (e.g. 11100010010);
- a 5-bit version number field specifying the protocol version number;
- an 8-bit packet type field;
- a 16-bit packet length field;
- a 32-bit data segment ID field;
- a 16-bit data segment length field;
- a 16-bit packet ID field; and
- a 64-bit error correction and detection field.

Barker codes, also called Barker sequences, are known in the art as having desirable properties for synchronization. Digital demodulator 315 of FIG. 3 includes an analog or digital matched filter for the Barker code used. In the absence of noise, the matched filter outputs a large signal only at the end of the Barker code which digital demodulator 315 uses in known techniques to acquire synchronization with broadcaster 100 of FIG. 1.

The 5-bit protocol version number field is used so that receiver 107 can tell if it is using outdated protocol software, in which case receiver 107 must wait for an update of the protocol software, which update will be transmitted using an earlier protocol. If binary protocol number 11111 is reached, the next protocol number is taken cyclically to be number 00000. Protocols change infrequently enough that this cyclic nature of protocol numbering has virtually no chance of confusing receiver 107.

The 8-bit packet type field allows up to 256 different types of packets, for example additional information content segments, software updates, and various types of receiver commands.

The 16-bit packet length field gives the length of the packet in bytes, allowing packet lengths up to 65,535 bytes. In alternative embodiments, packet lengths are specified in multiples of some fixed number of bytes, bits or other entities. If, for example, this fixed number is 2 and represents 2 bytes, then the 16-bit packet length field specifies half of the packet length in bytes, rounded up. Partial packets are filled with zeros or using other techniques known in the art.

For packets conveying content segments the 32-bit data segment ID field specifies a content segment number for the content segment being conveyed. For packets conveying information other than content segments, the 32-bit data segment ID field can be used for other purposes or filled with zeros or any other value.

The Reed-Solomon decoder in receiver 107 which corrects erasures needs to know k, the number of raw packets associated with data segment 405 of FIG. 4 (e.g., k=288 in FIG. 5). The number of raw packets associated with data segment 405 is specified by the 16-bit data segment length field, allowing up to $2^{16}$=65,536 packets per data segment.

The 16-bit packet ID field specifies the packet number within a data segment 405. For example, FIG. 5 depicts the 65,535 packets that can be used to convey a 2.88 MB data segment, and this field will contain the index of the packet (e.g., 290 for $P_{290}$ shown in FIG. 5).

The 64-bit error correction and detection field is redundant information used to correct single errors and detect virtually all multiple errors. When receiver 107 can see satellite transmitting antenna 105, the satellite radio channel typically has a bit error rate (BER) on the order of 1E-6. Processed packets 425 are 80,168 bits long (80,000 bits of data plus 168 bits of overhead as specified above for the various header fields), so the probability that a packet is received error-free is $0.999999^{80168}$=92.3%; the probability of a single error is 80168* $0.999999^{80167}$*1E-6=7.4%; and the probability of two or more errors is 0.3%. Hence 99.7% of received packets are error-free after application of a single error-correcting decoder, and only about one packet in 300 has uncorrectable errors.

In almost all situations, the undetected error rate P(e) can be upper-bounded by computing P(e) for a totally noisy channel. On a totally noisy channel, all $2^{80168}$ possible received points are equally likely, there are $2^{80104}$ codewords, and each codeword has a decoding region of volume 80169 (1 point for the codeword plus 80168 points that differ in one position from the codeword). Hence, on a totally noisy channel $$P(e)=2^{8104}*80169/2^{80168}=80169*2^{-64}=4.3E\text{-}15$$

and undetected errors are virtually non-existent.

Any error-correcting and detecting code known in the art can be used, with the preferred embodiment being a shortened binary BCH code. Since unshortened binary BCH codes have lengths which are one less than a power of two and processed packets 425 are 80,168 bits long, the unshortened block length of the BCH code is one less than the next highest power of two, or $2^{17}-1=131{,}071$ bits. As is known in the art, the BCH code is shortened by taking the first 131,071−80,153=50,918 bits to be zero and not sending them since they are known a priori. Methods for choosing the generator polynomial of this code and implementing the code in hardware are also known in the art. See, for example, R. Gallager, *Information Theory and Reliable Communication*, Wiley, N.Y., 1968, pp. 224-225 for the encoding circuitry (FIG. 6.5.5 being preferred) and pp. 238-239 for choosing the generator polynomial.

Receiver (Receiver) Packet Processing

Figure 6:
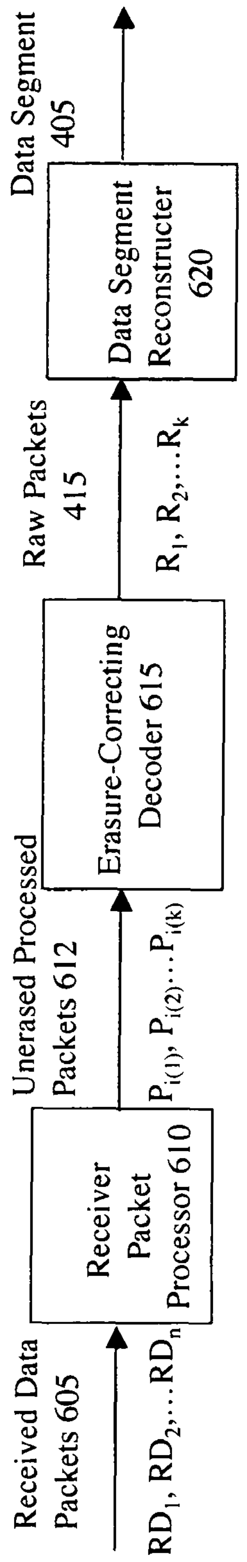
FIG. 6 is a block diagram of an exemplary embodiment of a receiver (receiver) communication protocol.

FIG. 6 depicts the operation of receiver communication protocol software 326 of FIG. 3 and largely mirrors FIG. 4 which depicts the transmitter communication protocol software 220. Received data packets 605, $RD_1$-$RD_n$, are noisy versions of (transmitted) data packets 435, $D_1$-$D_n$, and are input to receiver packet processor 610 for processing. While the preferred embodiment makes use of signal quality indicator 340 of FIG. 3 to only input received data packets 605 that are of sufficient quality, for simplicity of exposition the embodiment depicted in FIG. 6 presents all received data packets 605.

Receiver packet processor 610 makes use of various fields in the 168-bit packet header described in the section "Transmitter Packet Processing" immediately above.

To acquire synchronization, receiver packet processor 610 first computes the Hamming distance (number of bit differences) between the received and transmitted versions of the 11-bit Barker code synchronization field 11100010010 and uses these differences in known techniques to correct any synchronization errors. For example, if the receiver should slip one bit late the leftmost bit is lost and instead of 11100010010 it will see 1100010010X where X is the first bit of the next field. Depending on the value of X, this will cause five or six errors in the received Barker code and a perceived bit error rate (BER) of approximately 50%. In contrast, when the receiver is synchronized with the transmitter, the perceived BER will be the BER of the satellite radio channel, typically 1E-6.

Microprocessor 325 can use any technique known in the art for acquiring synchronization. For example, when receiver 107 is first powered up, microprocessor 325 can wait for signal quality indicator 340 to indicate that receiver 107 can see satellite transmitting antenna 105, at which point microprocessor 325 looks for occurences of the 11 bit Barker code 11100010010 in the received bit stream stored in buffer 320. Whenever this sequence occurs, microprocessor 325 then uses the other fields in the presumed packet header to process the presumed packet under direction of receiver packet processor software 610 as detailed below. If the error correction and detection decoder described below does not indicate an uncorrectable error, then the presumed packet is taken as a valid packet and synchronization is acquired. Since, as derived in the immediately preceding section, the error correction and detection decoder has at most a 4.3E-15 probability of not detecting an uncorrectable error, the probability of a false synchronization is also at most 4.3E-15 which, for all practical purposes, is zero.

Once initial synchronization is acquired in this manner, microprocessor 325 monitors the BER on the Barker code portion of successive packets and, if this BER is greater than a threshhold, 1E-3 in the preferred embodiment, microprocessor 325 tries moving synchronization plus or minus one bit, then plus or minus two bits, looking for a BER less than the threshhold. If none of these attempts produces a BER less than the threshhold, microprocessor 325 assumes synchronization has been totally lost and reverts to the synchronization acquisition strategy outlined above.

Receiver packet processor 610 next uses the 16-bit packet length field to determine the end of the packet and computes the syndrome of the received packet as the XOR of the computed 64-bit error correction and detection field with the received value, again using the circuitry depicted in Gallager, op cit, page 225, FIG. 6.5.5. If the 64-bit syndrome is all 0's then the received packet is error free or has undetectable errors, but since the undetected error rate is less than 4.3E-15, the packet can safely be assumed to be error-free.

If the syndrome has any 1's then an error correction phase is attempted by microprocessor 325 (or, in alternative embodiments, special purpose circuitry). The error-correcting phase can use any method known in the art, with the preferred embodiment using the known technique of a table lookup on non-zero syndromes to specify the single bit location to correct. Any such corrected packets then have their syndromes recomputed and accepted as valid only if the recomputed syndrome is all 0's. Any packets which fail to pass this test are discarded, considered erased, and not operated on further. (Alternative embodiments make use of these packets instead of discarding them, for example, by using the Reed-Solomon code in burst error-correcting mode instead of erasure-correcting mode.)

Receiver packet processor 610 next compares the 5-bit protocol number field with the operative protocol number that receiver 107 was last instructed to use by a receiver command 210. Except in rare circumstances, the two values will agree. If they disagree, receiver 107 knows that it has missed a protocol update and must wait until the protocol update is received. Until the protocol is updated receiver 107 also indicates an error condition on visual display 380.

After the above operations, receiver packet processor 610 waits until it has k (e.g., k=288 in FIG. 5) unerased processed packets 612, denoted $P_{i(1)}$, $P_{i(2)}$, . . . , $P_{i(k)}$, and passes these unerased processed packets 612 to erasure-correcting decoder 615. If there were no erasures (uncorrectable errors) on the satellite radio channel, $P_{i(1)}$, $P_{i(2)}$, . . . , $P_{i(k)}$ are the same as processed packets 425 in FIG. 4. But because the satellite radio channel is subject to erasures, the indices of these packets [i(1), i(2), . . . , i(k)] specified by their 16-bit packet ID fields are not necessarily consecutive integers. Erasure-correcting decoder 615 uses techniques known in the art for correcting erasures with a Reed-Solomon code, for example solving k simultaneous equations in k unknowns over $GF(2^{16})$ via a matrix inversion. Since each column in FIG. 5 (where k=288) represents a Reed-Solomon codeword, once the equations are solved for column 1, the same solution coefficients can be applied to the remaining 4,999 columns, so that portion of the computational effort per recovered symbol is reduced by a factor of 5,000.

After correcting erasures, the output of erasure-correcting decoder 615 is ($R_1$, $R_2$, . . . $R_k$), the sequence of raw packets 415, also depicted in FIG. 4 prior to transmission. Raw packets 415 are then assembled into data segment 405 by data segment reconstructer 620 and stored in memory 332 of FIG. 3, along with data segment 405's type (determined from the 8-bit packet type field in the packet header), data segment ID number (determined from the 32-bit data segment ID field in the packet header), and length in bytes (obtained as the product of the 16-bit packet length and the 16-bit data segment length fields in the packet header, or in an alternative embodiment, by including this length as a data segment header). Data segment 405 may be in encrypted or unencrypted form, depending on its type and economic value. For example, commercials will typically be transmitted and stored in unencrypted form, while music will typically be encrypted.

Cryptoproccesor Detail

Figure 7:
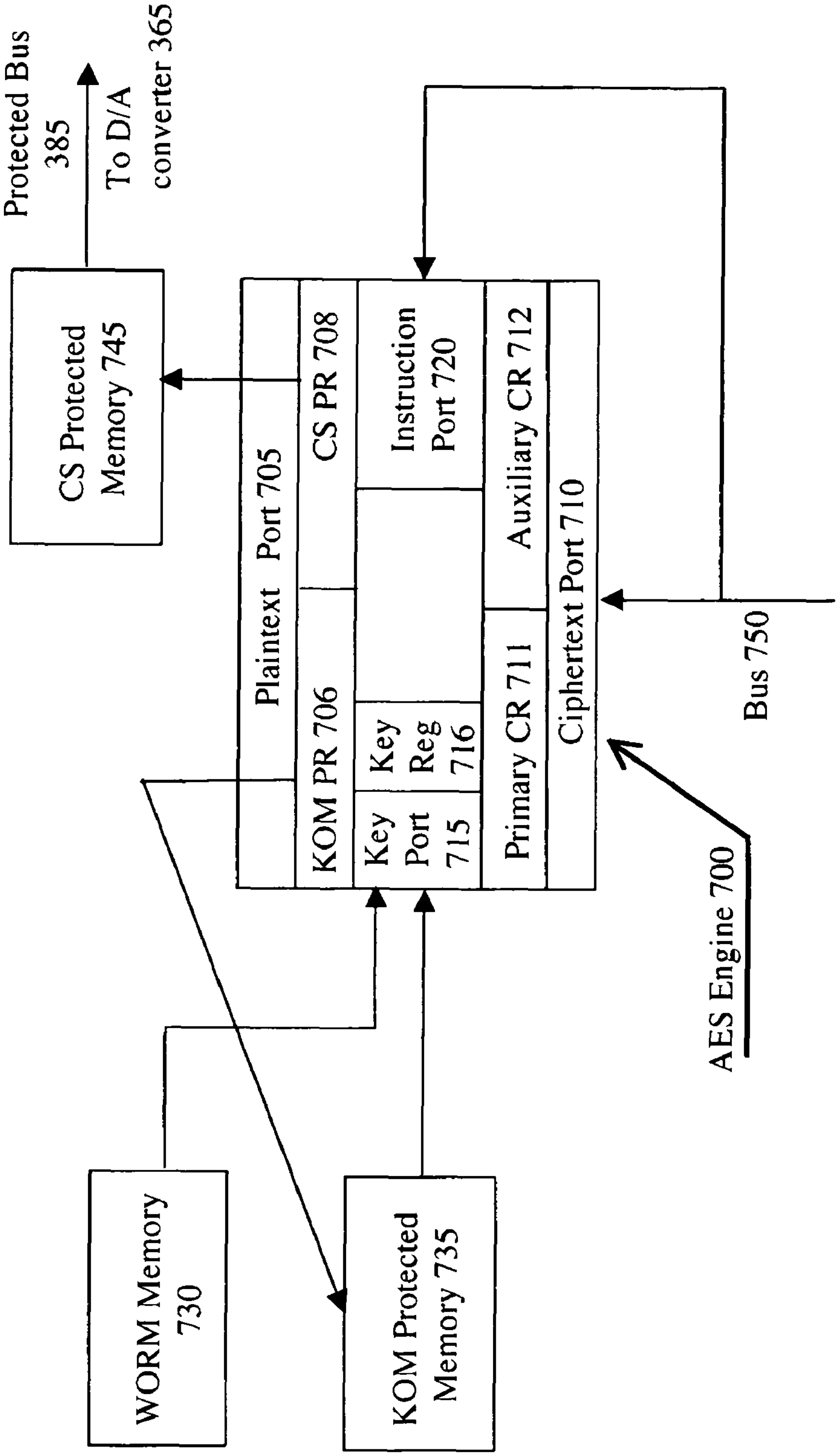
FIG. 7 is a block diagram of an exemplary embodiment of a cryptoprocessor.

FIG. 7 depicts cryptoprocessor 335 of FIG. 3 in greater detail. Cryptoprocessor 335 is preferably part of a custom chip implementation of the electronic portion of receiver 107. AES engine 700 implements NIST's AES algorithm as specified in FIPS PUB 197. As previously defined in the section "Encryption Operations," $C=E_K(P)$ denotes the ciphertext C produced by AES encrypting the 128-bit plaintext block P under action of key K; and $P=D_K(C)$ denotes the plaintext P produced by AES decrypting the 128-bit ciphertext block C under action of key K. As implied by this notation $P=D_K(E_K(P))$ since decryption under key K is the inverse operation to encryption under key K. As described previously, receiver 107 receives the following encrypted data:

- $E_{DK}$(KOM) where DK is receiver 107's Device Key written into WORM (Write Once, Read Many times) memory 730 at the time of manufacture and KOM is one of the Keys Of the Month for the tier of service to which receiver 107 is entitled. (Alternative embodiments can entitle a receiver 107 to multiple tiers of service.) $E_{DK}$(KOM) is transmitted as part of a receiver command 210, in this case a user authorization message.
- $E_{KOM}$(CS) where CS is a Content Segment such as a song.

Receiver 107 recovers an encrypted Content Segment by:

- first decrypting an encrypted Key Of the Month using its Device Key and storing the result in KOM protected memory 735; and
- then decrypting the encrypted Content Segment using the now decrypted Key Of the Month and storing the result in CS protected memory 745 for output on protected bus 385 also depicted FIG. 3.

As can be seen from the above two operations, receiver 107 performs only decryption operations. (Broadcaster 100 performs the corresponding encryption operations.) Therefore, while alternative embodiments also use AES in encryption mode, the preferred embodiment of receiver 107 depicted in FIG. 7 only uses AES in decryption mode.

AES engine 700 has four ports:

- a plaintext port 705;
- a ciphertext port 710;
- a key port 715; and
- an instruction port 720.

Since receiver 107's AES engine 700 operates only in decryption mode, ciphertext port 710 is an input port (i.e., no data can flow out of it) and plaintext port 705 is an output port (i.e., no data can flow into it). Key port 710 is an input port since no other element of receiver 107 has a legitimate reason for trying to read a key out of AES engine 700. Rather, once a key is input to key port 710, it is stored in key register 716, internal to AES engine 700 and which can only be read by AES engine 700 when instructed to decrypt a 128-bit ciphertext block by an instruction input to instruction port 720. Instruction port 720 is also an input port.

Preferably, as depicted in FIG. 7, AES engine 700's plaintext port has two physically distinct data paths connected to two physically distinct plaintext registers. Key of the month plaintext register 706 (abbreviated as KOM PR 706) and content segment plaintext register 708 (abbreviated as CS PR 708). These two plaintext registers are used to temporarily store the result of decryptions by AES engine 700. As indicated by the names of their associated plaintext registers, these two plaintext registers and data paths are used to store and communicate two different types of computed plaintexts with different economic values:

- Keys Of the Month (KOMs) and
- Content Segments (CSs) or other data.

The reason for having two physically distinct plaintext registers and data paths is to segregate these different computed plaintexts to minimize the probability that an opponent can learn the extremely valuable KOM. Further, the custom chip implementation of receiver 107's electronics is preferably designed with higher security (e.g., masking of data paths by metal layers) on the more valuable KOM PR 706 and its data path.

A receiver 107's Device Key (DK) is the most sensitive data that it stores since, if a pirate were to learn DK, he could compute KOMs for every month and tier of service to which that receiver 107 was authorized to have access. These computed KOMs could then be shared with specially produced "pirate receivers" which bypass any other security mechanisms (e.g., checking that the digital signature with a user authorization message is valid).While a separate plaintext register is not needed for DK since it is burned into WORM memory 730 at the factory and therefore never computed, WORM memory 730 must be protected. In particular, the data path from WORM memory 730 to key port 715 is given a high level of protection (e.g., a grounded metal overlay to foil attempts to tap into this data path with a microprobe).

AES engine 700 is a special purpose microprocessor which performs only cryptographic operations. Hence the name "cryptoprocessor" for element 335 of FIG. 3. (Cryptoprocessor 335 includes all of the elements of FIG. 7, not just AES engine 700, just as a normal microprocessor typically includes internal memory and registers.) The instruction set for AES engine 700 is extremely small and specific, allowing for a much higher level of security than with a normal microprocessor. Instructions executed by AES engine 700 are specified by microprocessor 325 of FIG. 3 and microprocessor 325 carries out corresponding operations on public (as opposed to secret) information.

The first instruction in AES engine 700's instruction set computes a 128-bit Key Of the Month for the tier of service that broadcaster 100 has authorized receiver 107 to receive. This instruction takes the form

DECRYPT_KOM(LOCATION, KOM#)

which causes microprocessor 325 to:

- retrieve the 128-bit Encrypted Key Of the Month EKOM, 4-bit tier of service TIER, and 4-bit month relative to the current date and time MONTH from the location in memory 332 specified by the bit string LOCATION,
- use the date and time that EKOM was received to translate the relative 4-bit MONTH field into an absolute 16-bit month field (allowing 65,536 months or over 5,000 years before cycling),
- store TIER and the computed 16-bit month field in a table of KOM information stored in memory 332 along with the location KOM# in KOM protected memory 735 where the decrypted KOM will be stored (see immediately below and note that KOM itself is never stored in memory 332), and communicate EKOM to AES engine 700's ciphertext port 710 via bus 750 (to enhance security bus 750 can convey information from less secure parts of receiver 107 to AES engine 700's ciphertext port, but to no other part of AES engine 700, and bus 750 cannot be used to retrieve information from any part of AES engine 700);

and causes AES engine 700 to store the 128 bits of EKOM in primary ciphertext register (Primary CR) 711, communicate the 256-bit Device Key DK from WORM memory 730 to AES engine 700's key port 715 and store DK in key register 716, execute an Electronic Code Book AES decryption to produce $D_{DK}$(EKOM) which stores the resulting 128-bit decrypted Key Of the Month KOM in KOM PR 706, and communicate KOM from KOM plaintext register 706 via plaintext port 705 to KOM protected memory 735 where it is stored in location KOM#, erasing any previous contents of that location.

KOM protected memory 735 can hold more than one Key Of the Month for two reasons:

As noted earlier, higher tier subscribers will need more than one KOM since content segments accessible to both higher tier and lower tier subscribers will be encrypted in a lower tier KOM.

KOM's for one or more future months can be predelivered to subscribers who have paid in advance and be ready for use immediately when the month changes.

WORM memory 730 is a write-once semiconductor memory so that, after its Device Key DK is burned into it at the factory, its contents cannot be changed. This prevents a group of pirate users from changing their DK's to all be the same and then illegally sharing user authorization messages with one another, with only one of them paying for service. WORM memory technology is known in the art of semiconductor fabrication and is used, for example to burn unalterable serial numbers into microprocessors, and to increase memory chip yields by burning in information on defective portions of memory which can then be avoided. One such WORM approach is to use fuses which are blown (written to) by a higher than normal voltage. It is "write once" since, once a fuse is blown, it cannot be returned to its original state.

The second instruction in AES engine 700's instruction set produces a decrypted Content Segment Block CSB which is part of a content segment CS for the tier of service that broadcaster 100 has authorized receiver 107 to receive in a given month, and then stores that decrypted Content Segment Block in CS protected memory 745 for output on protected bus 385 which also is depicted in FIG. 3. This instruction takes the form

DECRYPT_CSB(LOCATION1, LOCATION2, KOM#)

which causes microprocessor 325 to:

retrieve the 128-bit Encrypted Content Segment Block ECSB from the location in memory 332 specified by the bit string LOCATION1, if LOCATION2≠0, retrieve a 128-bit Initialization Vector (as defined in Cipher Block Chaining or CBC mode) IV from the location in memory 332 specified by the bit string LOCATION2 (LOCATION2=0 indicates that this Encrypted Content Segment Block is not the first so that an IV is not needed for its decryption; rather the preceding Encrypted Content Segment Block, which will already be stored in AES engine 700 from the previous instruction, is used in place of IV), communicate ECSB to AES engine 700's ciphertext port 710 if LOCATION2≠0, communicate IV to AES engine 700's ciphertext port 710, if LOCATION2=0, communicate IV=0 to AES engine 700's ciphertext port 710 (IV=0 is not allowed as an Initialization Vector, so this tells AES engine 700 that an IV is not being used);

and causes AES engine 700 to store ECSB in primary ciphertext register 711, if IV≠0, store IV in auxiliary ciphertext register 712, if IV=0, do not disturb the current contents of ciphertext register 712, if KOM# differs from the previous value used, communicate a 128-bit Key of the Month KOM from location KOM# in KOM protected memory 735 to AES engine 700's key port 715 and store KOM in key register 716 (if KOM# is the same as the previously used value, the required KOM is already in key register 716), execute an AES decryption $D_{KOM}$(ECSB) which stores the resulting CBC decrypted Content Segment Block CBC_CSB in CS plaintext register 708, XOR the contents of CS plaintext register 708 (CBC_CSB) with the contents of auxiliary ciphertext register 712 to produce the original Content Segment Block CSB and store the result in CS plaintext register 708 (since CBC mode encrypts the current plaintext block XORed with the previous ciphertext block, which previous ciphertext block is now stored in auxiliary ciphertext register 712), communicate CS from CS plaintext register 708 via plaintext port 705 to CS protected memory 745 where it is then output on protected bus 385 which, as shown in FIG. 3, will convey it to D/A converter 365, and transfer ECSB from primary ciphertext register 711 to auxiliary ciphertext register 712 (since in CBC mode, auxiliary ciphertext register 712 stores the previous ciphertext block).

The third (and in the preferred embodiment, the last) instruction in AES engine 700's instruction set causes AES Engine 700 to erase a KOM from KOM protected memory 735. This instruction takes the form

ERASE_KOM(KOM#)

which causes microprocessor 325 to erase the entry corresponding to KOM# in the table of KOM information stored in memory 332 and causes AES Engine 700 to erase the contents of KOM# in KOM protected memory 735. Erasing KOMs that are not needed in the immediate future inhances security. An alternative, less secure embodiment keeps KOMs until protected KOM memory 735 is full, at which point unneeded KOMs are erased, for example on a FIFO basis.

Alternative Embodiments

The foregoing descriptions of specific embodiments of the present invention are presented for the purposes of illustration and description. They are not intended to be exhaustive or to limit the scope of the invention and many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. For example:

Although the present invention has been illustrated in connection with satellite radio, it can be used in connection with any broadcast or media distribution system and, in particular with terrestrial radio and television services. The present invention is also applicable to Internet radio and similar methods of broadcast, in which case multiplexing is accomplished via packetization and what is herein termed the receiver's demodulator is part of its modem (modulator-demodulator pair) or other signal reconstruction apparatus. Hence, used herein:

the term "multiplex" and its various derivatives (multiplixed, multiplexor, etc.) includes any method of combining two or more types of information, or two or more data streams, in any manner whatsoever, whether or not the method includes the word root "multiplex";

the term "demodulator" and its various derivatives (demodulate, demodulated, etc.) includes any device for reconstructing a signal, whether or not the device includes the word root "demodulate";

the term "receiver" includes devices, whether or not the the word "receiver" is included in their names (e.g., PC's, playback devices, iPod, MP3 player, etc.);

the term "transmitter" includes devices, whether or not the the word "transmitter" is included in their names (e.g., head end, distribution center, etc.); and the term "broadcast system" includes media distribution systems, whether or not the the word "broadcast" is included in their names (e.g., Internet radio, music subscription services, etc.).

Other names and words used herein are intended to be interpreted in a similar manner. For example, the digital microphone 350 can be any acoustic transducer.

While the preferred embodiment utilizes an extremely secure cryptoprocessor, alternative embodiments can use less secure cryptoprocessors (e.g., a conventional microprocessor and encryption software), with an attendant reduction in security level. While the preferred embodiment utilizes push buttons for sensing user input to user interface 360, other means such as voice commands may be used instead. While the preferred embodiment utilizes receiver commands 210 that are communicated as separate entities, receiver commands 210 can be embedded in other commands, program content, or other data. It is the effect that receiver commands 210 have on receiver 107 that makes them receiver commands 210, not their existence as a separate entity.

With many other variations also possible within the spirit of the present invention, it is therefore intended that the scope of the invention be defined by the following claims and their equivalents.

What is claimed is:

1. A broadcast system comprising:

one or more transmitters which transmit one or more signals, such that said one or more signals, combined if more than one, comprise:

program content for one or more complete programs, wherein each complete program can include advertising and is playable at a receiver in unmodified form;

substitution content that can include substitution advertising and/or advertising-free substitution program content; and receiver commands including receiver commands directed at specific receivers or classes of receivers; and a plurality of receivers, including a first receiver, a second receiver, and a third receiver, each respective receiver configured to:

demodulate a respective portion of said program content; and create a respective output program, wherein each respective receiver of said first and second receivers is further configured to:

demodulate a respective portion of said substitution content;

store a portion of said substitution content;

demodulate a portion of said receiver commands; and replace, in response to at least one of said receiver commands, a respective selected non-null portion of said demodulated program content with a respective selected non-null portion of said substitution content stored in the respective receiver to form said respective output program containing a respective replacement portion of substitution content, wherein said third receiver is not configured to carry out said replacing in response to one or more receiver commands, such that said first, second, and third receivers create a first output program, a second output program, and a third output program respectively when simultaneously tuned to be receiving a particular program of said program content, such that said first, second, and third output programs can be different, and such that said third output program comprises said particular program of said complete programs without any substitution content, including any advertising included in said particular program, wherein at least one of A and B is true, A being that in the case said first receiver is operating at a first tier, and said second receiver is operating at a second tier lower than said first tier, as a result of one or more different respective receiver commands directed to said first and second receivers, said first output program includes less advertising than said second output program when said first and second receivers are simultaneously tuned to be receiving the particular program, and B being that at least one of said receiver commands that cause said replacing is targeted to one or more particular receivers according to one or more demographic characteristics such that said first and second output programs can be different as a result of at least one of said one or more demographic characteristics being different for said first and second receivers when said first and second receivers are simultaneously tuned to be receiving the particular program.

2. A broadcast system as in claim 1 wherein at least one of said respective replacement portions of substitution content comprises advertising.

3. A broadcast system as in claim 1 wherein at least one of said selected non-null portions of said demodulated program content comprises advertising.

4. A broadcast system as in claim 1, wherein at least one of said receiver commands that cause said replacing is targeted to one or more particular receivers according to one or more demographic characteristics such that said first and second output programs can be different as a result of at least one of said one or more demographic characteristics being different for said first and second receivers when said first and second receivers are simultaneously tuned to be receiving the particular program.

5. The broadcast system of claim 1, wherein at least a portion of said substitution content comprises demographically targeted advertising.

6. The broadcast system of claim 5 wherein said receiver commands include demographically related receiver commands that cause substituting according to a set of one or more demographic characteristics of a receiving receiver, wherein said first and second receivers have at least one characteristic of said set different, and wherein said substituting by said first and second receivers responsive to at least one of said demographically related receiver commands causes different demographically targeted advertising to be included in said first and second programs produced when said first and second receivers are simultaneously tuned to be receiving said particular program.

7. The broadcast system of claim 6 in which at least one of said demographically related receiver commands is directed to a single one of said receivers.

8. A broadcast system as in claim 1, wherein in the case said first receiver is operating at a first tier, and said second receiver is operating at a second tier lower than said first tier, as a result of one or more different respective receiver commands directed to said first and second receivers, said first output program includes less advertising than said second output program when said first and second receivers are simultaneously tuned to be receiving the particular program.

9. The broadcast system of claim 1, wherein at least a portion of one or both of said substitution content and said receiver commands is encoded with an erasure-correcting code to protect data included therein.

10. The broadcast system of claim 9 in which said data protected by said erasure-correcting code is transmitted in segments, at least one of said segments being transmitted at two or more points in time with a time separation between the two or more transmissions.

11. The broadcast system of claim 10 in which the time separation(s) between said two or more points in time are at least partially randomized.

12. The broadcast system of claim 1, wherein a portion of said program content is transmitted within the 88-108 MHz band, within the 540-1700 kHz band, or within a Digital Audio Radio Satellite band.

13. A broadcast system as in claim 1, wherein said first receiver is operating at a first tier, and said second receiver is operating at a second tier lower than said first tier, as a result of one or more different respective receiver commands directed to said first and second receivers, said first output program includes less advertising than said second output program when said first and second receivers are simultaneously tuned to be receiving the particular program.

14. A broadcast system as in claim 1 in which at least one of said receiver commands depends on information communicated by at least one of said plurality of receivers over a reverse channel.

15. A broadcast system as in claim 1 such that, for one or both of said first and second receivers, said substituting in the respective receiver depends at least in part on information stored in a local database located at the respective receiver, said information representing one or more characteristics of one or more users of the respective receiver.

16. A broadcast system comprising:

(a) one or more transmitters configured to transmit at least (i) program content that may include advertising, (ii) substitution content that may include advertising content, and (iii) receiver commands; and (b) a plurality of receivers, including a subset consisting of some but not all of said plurality of receivers, each receiver in said subset including:

(i) memory for storing a portion of said substitution content to form stored substitution content; and (ii) a controller responsive to at least one of said receiver commands and configured to select a portion of said stored substitution content; and to replace a portion of said program content with said selected portion of said stored substitution content;

wherein said subset includes a first receiver that when tuned to be receiving a particular program of said program content produces as output a first program, and a second receiver that when simultaneously tuned to be receiving said particular program produces as output a second program;

wherein said receiver commands include:

at least one receiver command that indicates how said first receiver is to carry out replacing, and at least one receiver command that indicates how said second receiver is to carry out replacing, wherein said program content sent by said one or more transmitters includes one or more complete programs playable by each of said plurality of receivers in unmodified form, each of said complete programs including one or both of:

(i) advertising-free content such that at least some of said advertising-free content can be replaced by each receiver of said subset that receives said program content with substitution content comprising advertising, and (ii) content that includes sent advertising such that at least some of said sent advertising can be replaced by each receiver of said subset that receives said program content with substitution content comprising advertising-free content, such that different substitution content can be played back at said first receiver and said second receiver when first receiver and said second receiver are simultaneously tuned to be receiving said particular program, and such that a third receiver that is configured to receive said program content sent by said one or more transmitters and that (i) is not part of said subset, or (ii) unable to be configured to replace a portion of said program content with a portion of said substitution content, can play back said program content sent by said one or more transmitters, wherein at least A or B is true,.

A being that the at least one receiver command for the first and the second receiver that respectively indicates how said first receiver and second receiver is to carry out replacing include at least one receiver command that indicates how said first receiver and second receiver, respectively, is to carry out replacing in a manner related to one or more characteristics of said first receiver and second receiver, respectively, including one or more items of demographic information related to said first receiver and said second receiver, respectively, such that the type of and/or amount of substitution content in said first and second programs can be targeted to said first and second receivers, respectively, according to one or more of said items of demographic information about said first and second receivers, respectively, and B being that said first receiver is operating at a first tier, and said second receiver is operating at a second tier lower than said first tier, and that said receiver commands sent by said one or more transmitters include at least one receiver command related to the tier of service, such that the replacing in response to said at least one receiver command related to the tier of service differs according to the tier of service, such that said first program includes less advertising than said second program.

17. The broadcast system of claim 16, wherein transmitting by the one or more transmitters includes broadcasting by a broadcaster, wherein at least one receiver command for the first and the second receiver that respectively indicates how said first receiver and second receiver is to carry out replacing includes at least one receiver command that indicates how said first receiver and second receiver, respectively, is to carry out replacing in a manner related to one or more characteristics of said first receiver and second receiver, respectively, including one or more items of demographic information related to said first receiver and said second receiver, respectively, the broadcast system further comprising:

a reverse channel for communicating information to said broadcaster;

wherein at least some of said receiver commands are based on demographic information about the receiver and depend at least in part on information communicated to said broadcaster over said reverse channel such that the type of and/or amount of substitution content played back by said first and/or second receiver can be targeted to said respective first and/or second receiver according to one or more items of demographic information gathered by said broadcaster about said respective first and/or second receiver.

18. A broadcast system as in claim 17 in which at least one of said receiver commands based on demographic information about the receiver is directed to a single one of said receivers.

19. The broadcast system of claim 16, wherein said broadcast system is a tiered subscription broadcast system, wherein said first receiver is operating at a first tier, and said second receiver is operating at a second tier lower than said first tier, and that said receiver commands sent by said one or more transmitters include at least one receiver command related to the tier of service, such that the replacing in response to said at least one receiver command related to the tier of service differs according to the tier of service, such that said first program includes less advertising than said second program.

20. A broadcast system as in claim 16, wherein said selecting by the controller is responsive to at least one receiver command that specifies the selected portion of the substitution content.

21. A broadcast system as in claim 16, wherein said selecting by the controller is responsive to at least one receiver command that specifies the selected portion of the substitution content, and wherein said replacing includes said controller checking if said memory contains said specified selected portion of the substitution content, and if said memory does not contain said specified selected portion, selecting an alternate portion of stored substitution content, and replacing said portion of said program content with said selected alternate portion.

22. A broadcast system as in claim 16, wherein said portion of the program content that is replaced with said selected portion of substitution content is specified in one or more of said receiver commands. .

23. A broadcast system as in claim 16, wherein at least one of said receiver commands for said first receiver is based on demographic information about the first receiver and depends on information communicated by said first receiver over a reverse channel.

24. A broadcast system comprising:

a broadcaster broadcasting at least program content comprising one or more complete programs that can include advertising, substitution content that can include advertising, and demographically related receiver commands;

a plurality of receivers; and a demographic information aggregator which provides information to said broadcaster about at least some of said plurality of receivers, wherein each of a subset but not all of said plurality of receivers comprises:

(i) one or more demodulators for demodulating a portion of said program content, a portion of said substitution content, and a portion of said demographically related receiver commands;

(ii) memory for storing the demodulated portion of substitution content to form stored substitution content; and (iii) a receiver controller for:

selecting a portion of the stored substitution content; and while tuned to a particular program of the program content, forming an output program for the particular program including replacing a portion of said program content with the selected portion of the stored substitution content, such that the output program includes the selected portion of the stored substitution content, wherein:

said demographically related receiver commands depend at least in part on the information provided by said demographic information aggregator to said broadcaster;

said receiver controller's selection of said selected stored substitution content depends at least in part on said demographically related receiver commands, and wherein said program content broadcast by said broadcaster includes one or more complete programs playable by each of said plurality of receivers in unmodified form, each of said complete programs including one or both of:

(i) advertising-free content such that at least some of said advertising-free content can be replaced by each receiver of said subset that receives said program content with substitution content comprising advertising, and (ii) content that includes sent advertising such that at least some of said sent advertising can be replaced by each receiver of said subset that receives said program content with substitution content comprising advertising-free content, such that a particular receiver that is configured to receive said program content broadcast by said broadcaster and that (i) is not part of said subset, or (ii) unable to be configured to replace a portion of said program content with a portion of said substitution content, can play back said program content broadcast by said broadcaster without any replacing.

25. The broadcast system of claim 24 in which said broadcast system is a tiered subscription broadcast system in which:

a first receiver of said plurality of receivers, associated with a first tier of receiver privileges, tuned to be receiving a particular program, produces as output a first program;

a second receiver of said plurality of receivers in a second tier of receiver privileges lower than said first tier, simultaneously tuned to be receiving said particular program, produces as output a second program, and said first program includes less advertising than said second program as a result of said replacing in said first receiver being different than said replacing in said second receiver.

26. The broadcast system of claim 25 in which the information provided by said demographic information aggregator to said broadcaster depends at least in part on Internet based observations of subscriber behavior.

27. The broadcast system of claim 24 in which the information provided by said demographic information aggregator to said broadcaster depends at least in part on Internet based observations.

28. A broadcast system as in claim 24 in which at least one of said demographically related receiver commands depends on information communicated by at least one of said plurality of receivers over a reverse channel.

29. A broadcast system comprising:

one or more transmitters configured to transmit:

(i) program content that may include advertising;

(ii) substitution content that may include advertising; and (iii) receiver commands;

wherein the one or more transmitters are configured to transmit to a plurality of receivers configured to receive at least the program content, each receiver in a subset consisting of some but not all of said plurality of receivers being configured to:

demodulate a portion of said program content;

demodulate a portion of said substitution content;

store a portion of the demodulated substitution content to form stored substitution content;

demodulate a portion of said receiver commands; and in response to at least one of said receiver commands that specifies a portion of said substitution content, checks whether the specified portion of the substitution content is accessible by said receiver, if said check is affirmative replace a portion of said demodulated program content with said specified portion of the substitution content, and if said check is negative, insert a different portion of stored substitution content into said demodulated program content, said different portion of substitution content being related to said specified portion of the substitution content, wherein said program content sent by said one or more transmitters includes one or more complete programs playable by each of said plurality of receivers in unmodified form, each of said complete programs including one or both of:

(i) advertising-free content such that at least some of said advertising-free content can be replaced by each receiver of said subset that receives said program content with substitution content comprising advertising, and (ii) content that includes sent advertising such that at least some of said sent advertising can be replaced by each receiver of said subset that receives said program content with substitution content comprising advertising-free content, such that a particular receiver that is configured to receive said program content sent by said one or more transmitters and that (i) is not part of said subset, or (ii) unable to be configured to replace a portion of said program content with a portion of said substitution content, can play back said program content sent by said one or more transmitters without any replacing.

30. The broadcast system of claim 29 wherein said different portion of stored substitution content includes advertising related to advertising included in said specified portion of substitution content.

31. The broadcast system of claim 29 in which said receiver commands comprise demographically related receiver commands, and at least one of said demographically related receiver commands is directed to a single one of said receivers.

32. A broadcast system comprising:

a plurality of receivers; and one or more transmitters which, combined if more than one, transmit at least:

(i) program content that may include advertising, (ii) substitution content that may include advertising, and (iii) receiver commands;

wherein each of a subset that includes some but not all of said plurality of receivers comprises:

memory for storing a portion of said substitution content to form stored substitution content; and a controller for forming a respective output program, the forming comprising, responsive to at least one of said receiver commands, including a selected portion of the stored substitution content in place of a portion of said program content;

such that, during a time period at which a first receiver and a second receiver of said subset of the plurality of receivers are simultaneously tuned to be receiving a particular program of said program content, and to output a first and a second output program:

the first receiver has a first selected portion of the stored substitution content included in place of a portion of said particular program;

the second receiver has a second selected portion of the stored substitution content included in place of a portion of said program content;

said first selected portion of the stored substitution content being different than said second selected portion of the stored substitution content, wherein said program content sent by said one or more transmitters includes one or more complete programs playable by each of said plurality of receivers in unmodified form, each of said complete programs including one or both of:

(i) advertising-free content such that at least some of said advertising-free content can be replaced by each receiver of said subset that receives said program content with substitution content comprising advertising, and (ii) content that includes sent advertising such that at least some of said sent advertising can be replaced by each receiver of said subset that receives said program content with substitution content comprising advertising-free content, such that a particular receiver that is configured to receive said program content sent by said one or more transmitters and that (i) is not part of said subset, or (ii) unable to be configured to replace a portion of said program content with a portion of said substitution content, can play back said program content sent by said one or more transmitters without any replacing, wherein at least one of A and B is true, A being that in the case said first receiver is operating at a first tier, and said second receiver is operating at a second tier lower than said first tier, as a result of one or more different respective receiver commands directed to said first and second receivers, said first output program includes less advertising than said second output program when said first and second receivers are simultaneously tuned to be receiving the particular program, and B being that at least one of said receiver commands that cause forming an output program using a selected portion of the stored substitution content in place of a portion of the particular program is targeted to one or more particular receivers according to one or more demographic characteristics such that said first and second output programs can be different as a result of at least one of said one or more demographic characteristics being different for said first and second receivers when said first and second receivers are simultaneously tuned to be receiving the particular program.

33. A broadcast system as in claim 32 in which said at least one of said receiver commands comprises a demographically targeted receiver command.

34. A broadcast system as in claim 33 in which at least one demographically targeted receiver command is directed to a single one of said subset of receivers.

35. A broadcast system as in claim 32 in which:

at least one receiver in of said plurality of receivers that is not in said subset produces an output program which is independent of said substitution content.

36. A broadcast system as in claim 32, wherein said including a selected portion of the stored substitution content in place of a portion of said program content is responsive to at least one receiver command that specifies the selected portion of the substitution content.

37. A broadcast system as in claim 36, wherein said including a selected portion of the stored substitution content in place of the portion of said program content further includes checking if the specified selected portion is stored in the receiver, and if not stored, including alternate substitution content stored in the receiver in place of the portion of said program content rather than the specified selected portion of the substitution content.

* * * * *